US008885270B2

(12) United States Patent
Tanaka et al.

(10) Patent No.: US 8,885,270 B2
(45) Date of Patent: Nov. 11, 2014

(54) IMAGING LENS SYSTEM, IMAGING OPTICAL DEVICE, AND DIGITAL APPLIANCE

(75) Inventors: Hiroaki Tanaka, Sakai (JP); Keiji Matsusaka, Osaka (JP); Eigo Sano, Hino (JP); Maiko Nishida, Sakai (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 51 days.

(21) Appl. No.: 13/637,327

(22) PCT Filed: Mar. 22, 2011

(86) PCT No.: PCT/JP2011/056738
§ 371 (c)(1),
(2), (4) Date: Sep. 25, 2012

(87) PCT Pub. No.: WO2011/118555
PCT Pub. Date: Sep. 29, 2011

(65) Prior Publication Data
US 2013/0016261 A1    Jan. 17, 2013

(30) Foreign Application Priority Data
Mar. 26, 2010   (JP) .................................. 2010-073145

(51) Int. Cl.
G02B 3/02    (2006.01)
G02B 9/12    (2006.01)
G02B 13/02   (2006.01)

(52) U.S. Cl.
USPC ........... 359/716; 359/740; 359/784; 359/789; 359/791

(58) Field of Classification Search
USPC ........................ 359/716, 740, 784, 789, 791
See application file for complete search history.

(56) References Cited

U.S. PATENT DOCUMENTS

| 7,408,723 B1* | 8/2008 | Lin .............................. 359/715 |
| 7,420,609 B2* | 9/2008 | Yamaguchi et al. .......... 359/791 |
| 2009/0052060 A1* | 2/2009 | Lin et al. ....................... 359/773 |
| 2009/0207507 A1* | 8/2009 | Shinohara ..................... 359/773 |
| 2011/0134305 A1* | 6/2011 | Sano et al. .................... 359/764 |
| 2013/0169852 A1* | 7/2013 | Sano et al. .................... 359/714 |

FOREIGN PATENT DOCUMENTS

| CN | 101046542 | 10/2007 |
| CN | 101153952 | 4/2008 |
| JP | 2007-108534 | 4/2007 |
| JP | 2007-264180 | 10/2007 |
| JP | 2008-076953 | 4/2008 |
| JP | 2009-162810 | 7/2009 |
| JP | 2009-192820 | 8/2009 |

* cited by examiner

*Primary Examiner* — Evelyn A. Lester
(74) *Attorney, Agent, or Firm* — Cozen O'Connor

(57) ABSTRACT

A single-focal-length imaging lens system achieves focusing by, while keeping first and third lens groups stationary relative to the image plane, moving a second lens group along the optical axis. The second lens group includes a positive lens element. The third lens group includes an aspherically shaped lens element having an inflection point at a position other than the intersection with the optical axis. The first and second air lenses formed by the intervals between the first and second and between the second and third lens groups have negative and positive refractive powers respectively. The conditional formula $0 \leq |Fi1/Fi2| - |Fm1/Fm2| \leq 10$ is fulfilled (Fi1 and Fi2 representing the focal lengths of the first and second air lenses, respectively, when focusing on the infinite object distance; Fm1 and Fm2 representing the focal lengths of the first and second air lenses, respectively, when focusing on the closest object distance).

15 Claims, 25 Drawing Sheets

EX1

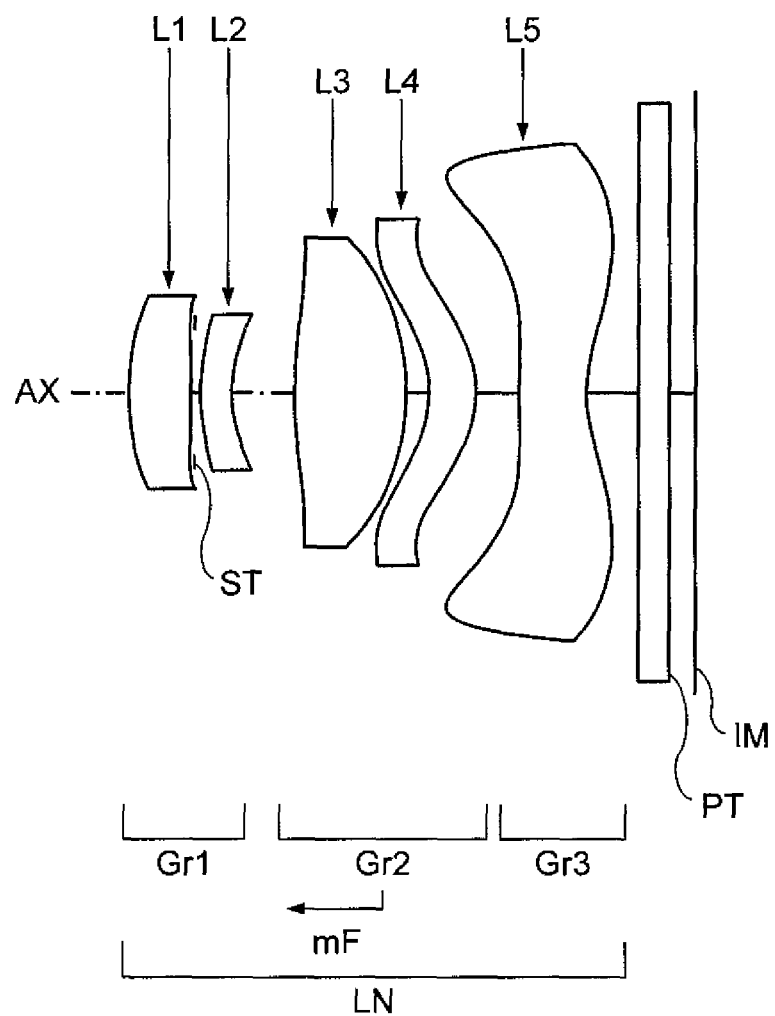

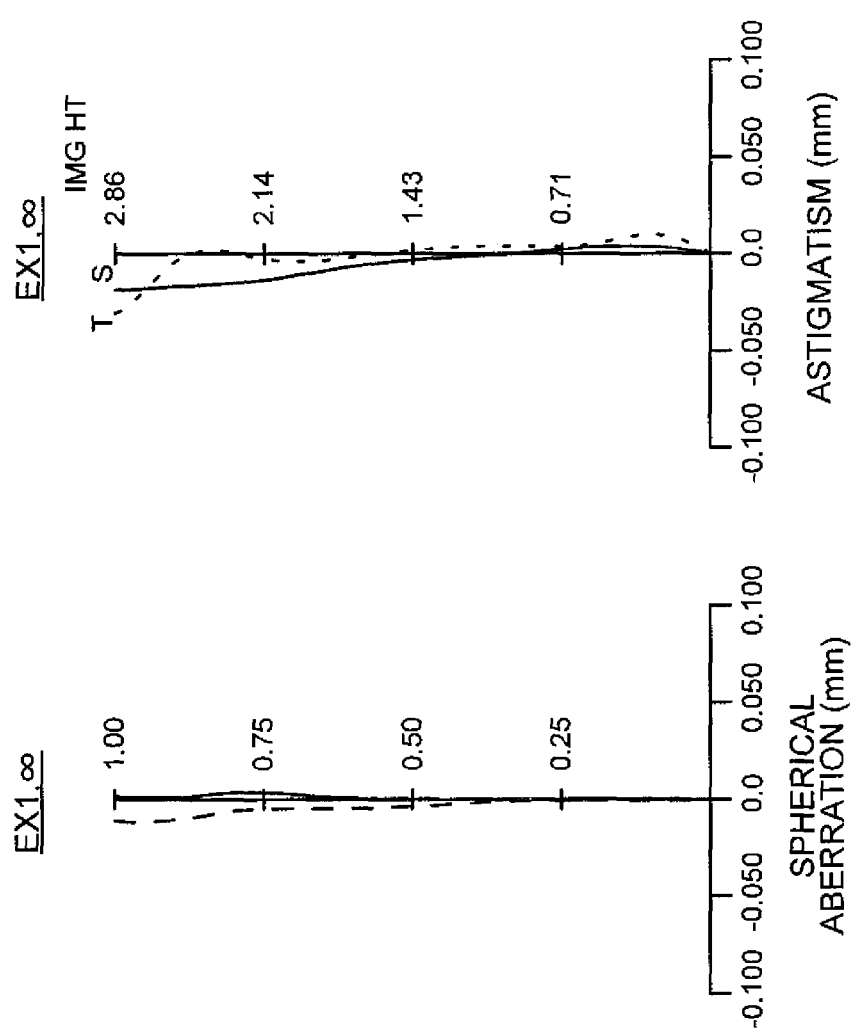

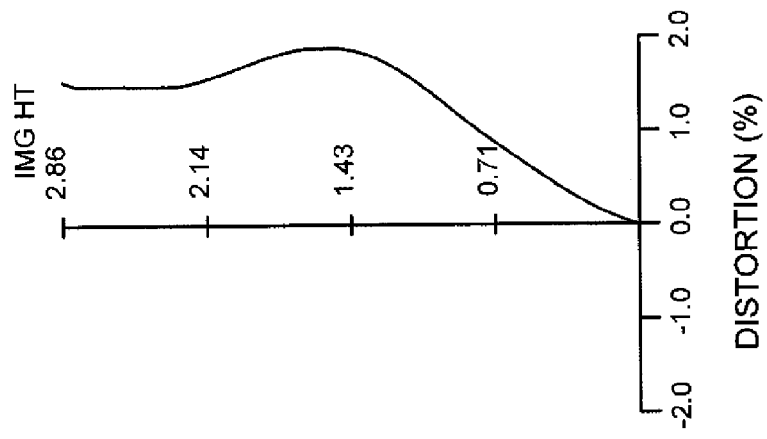
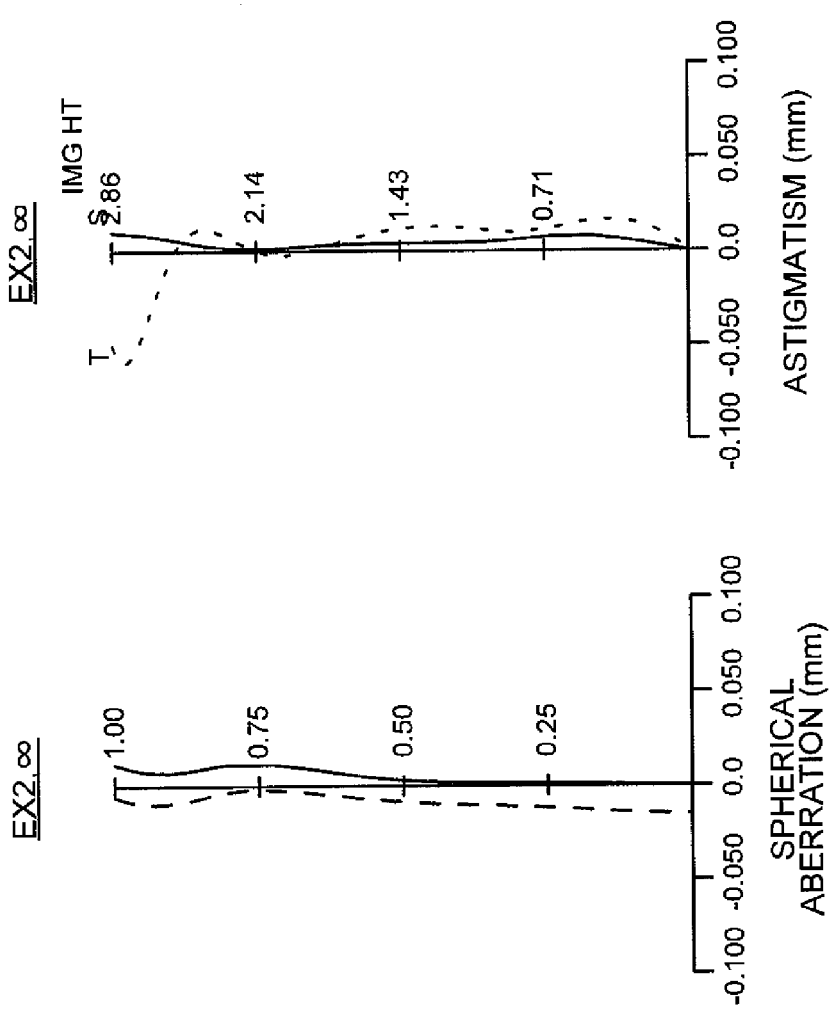

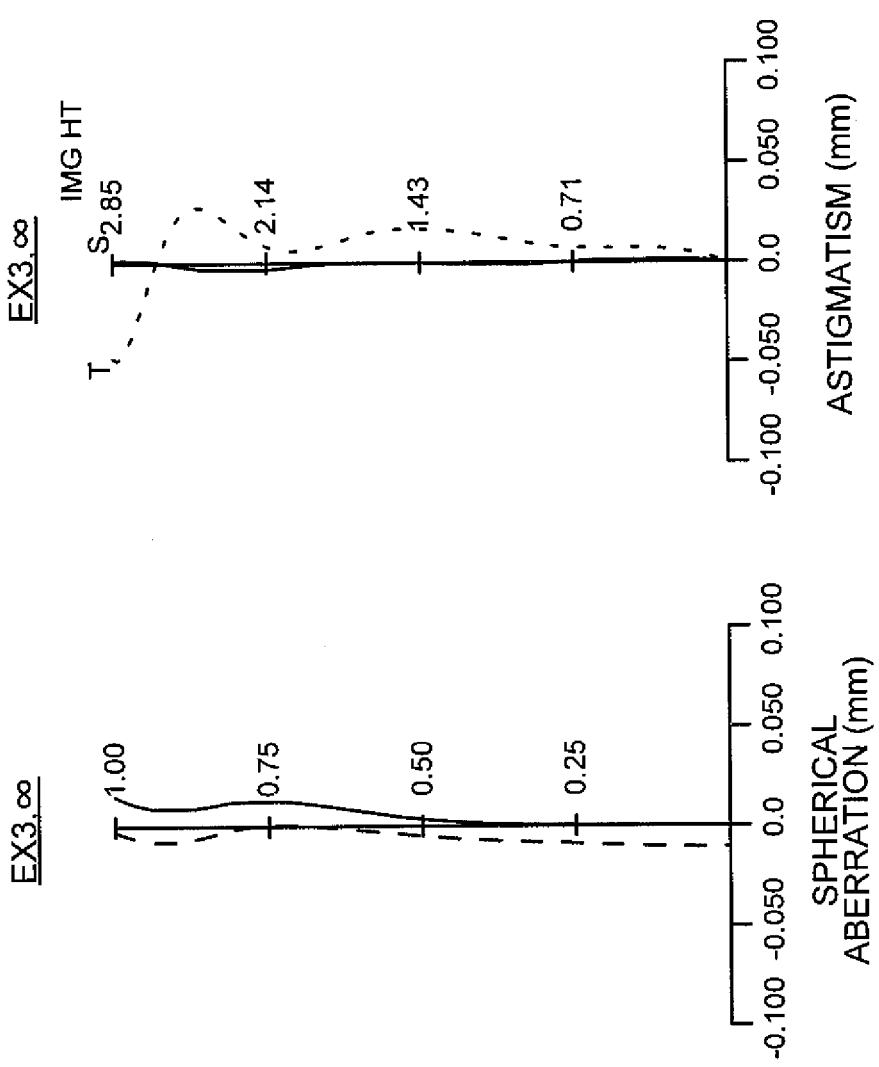

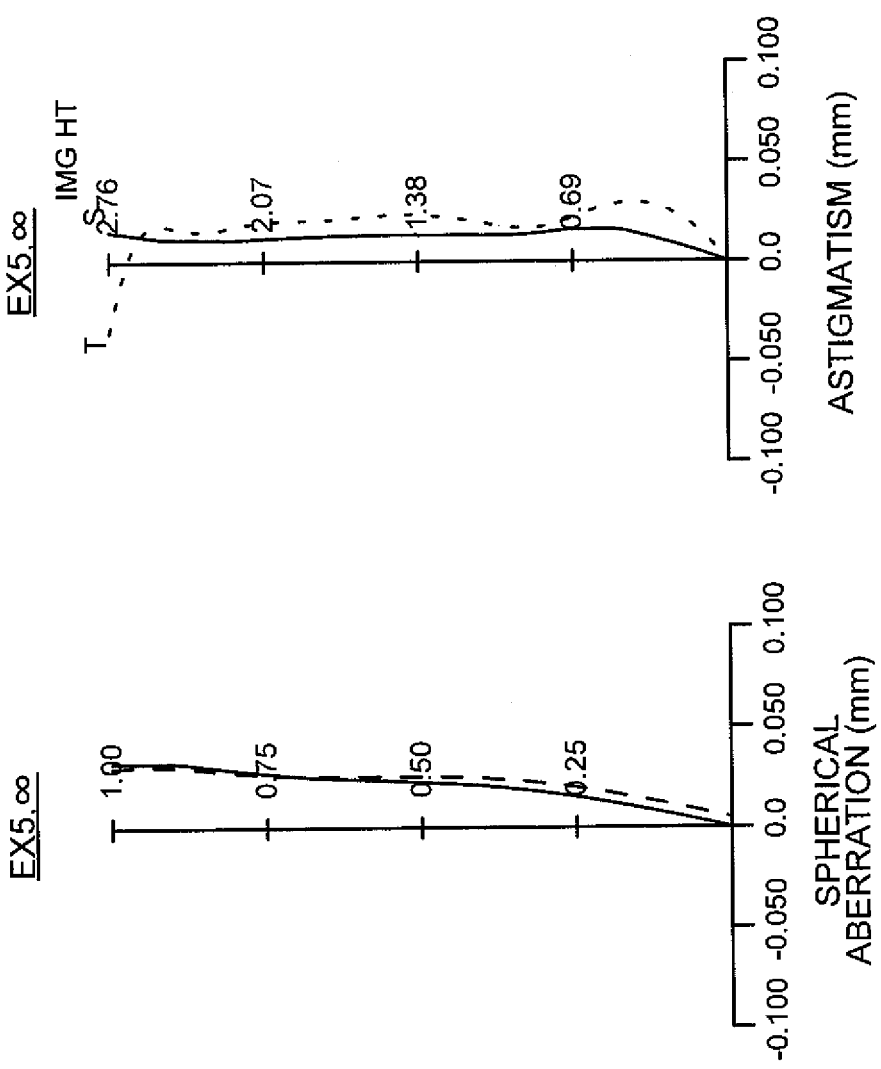

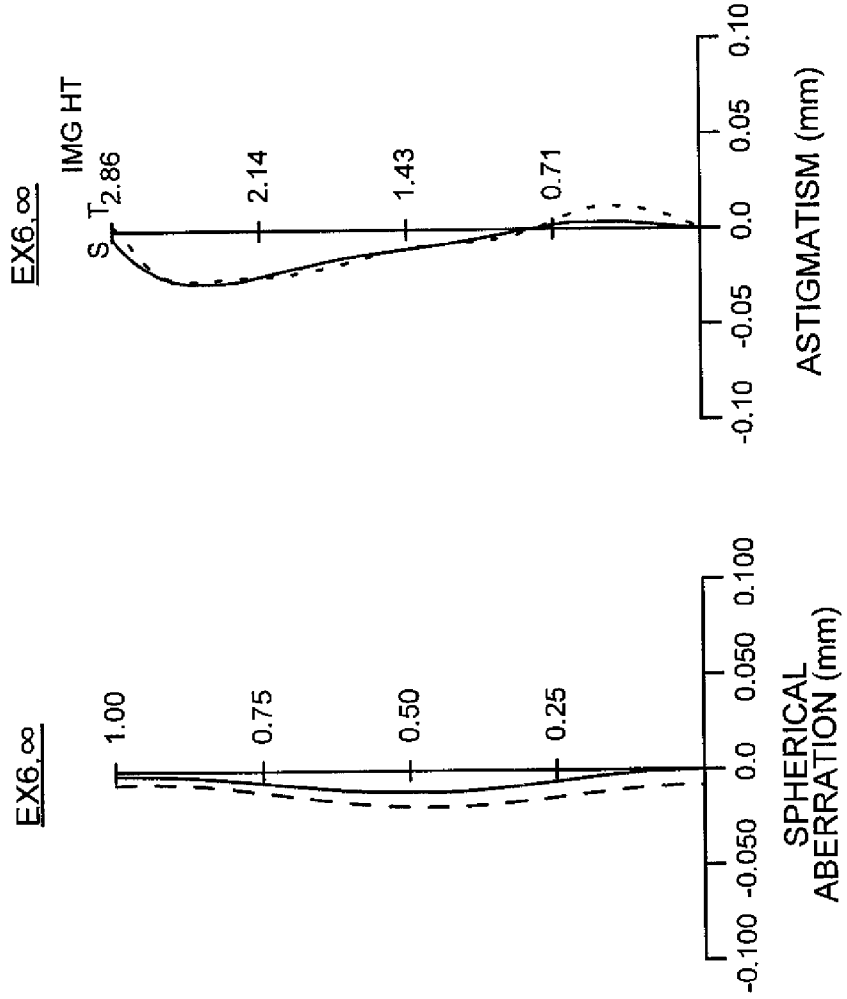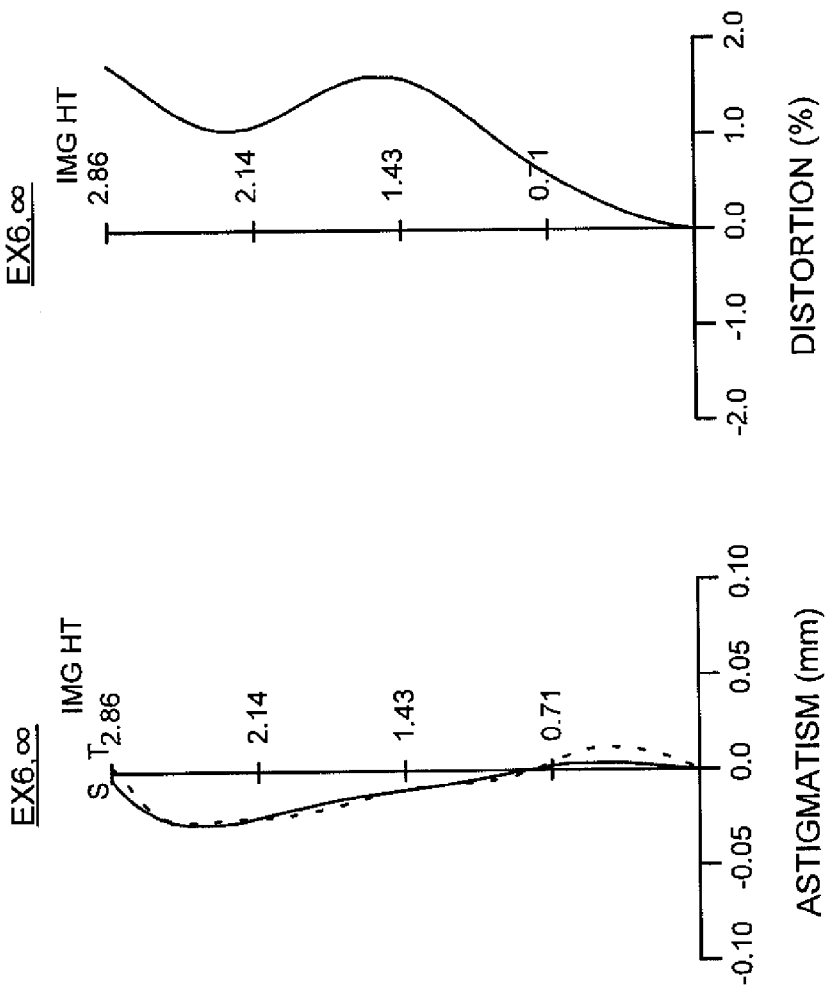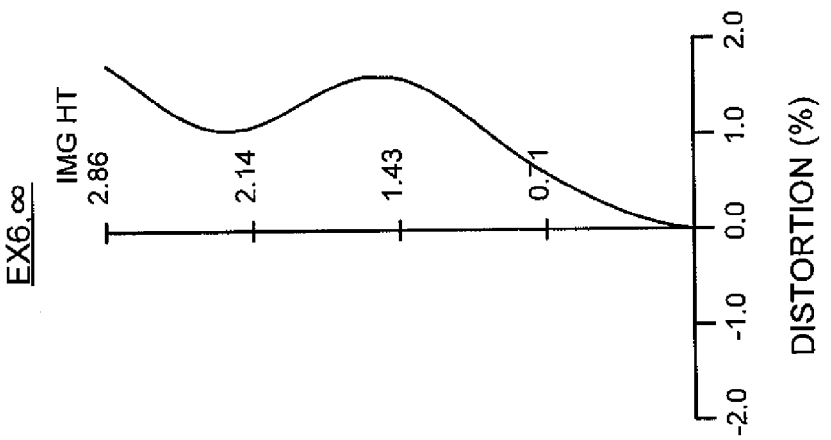

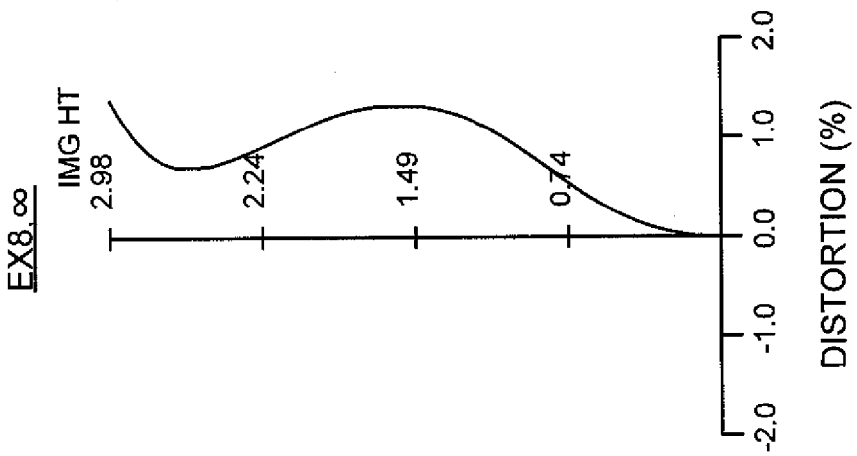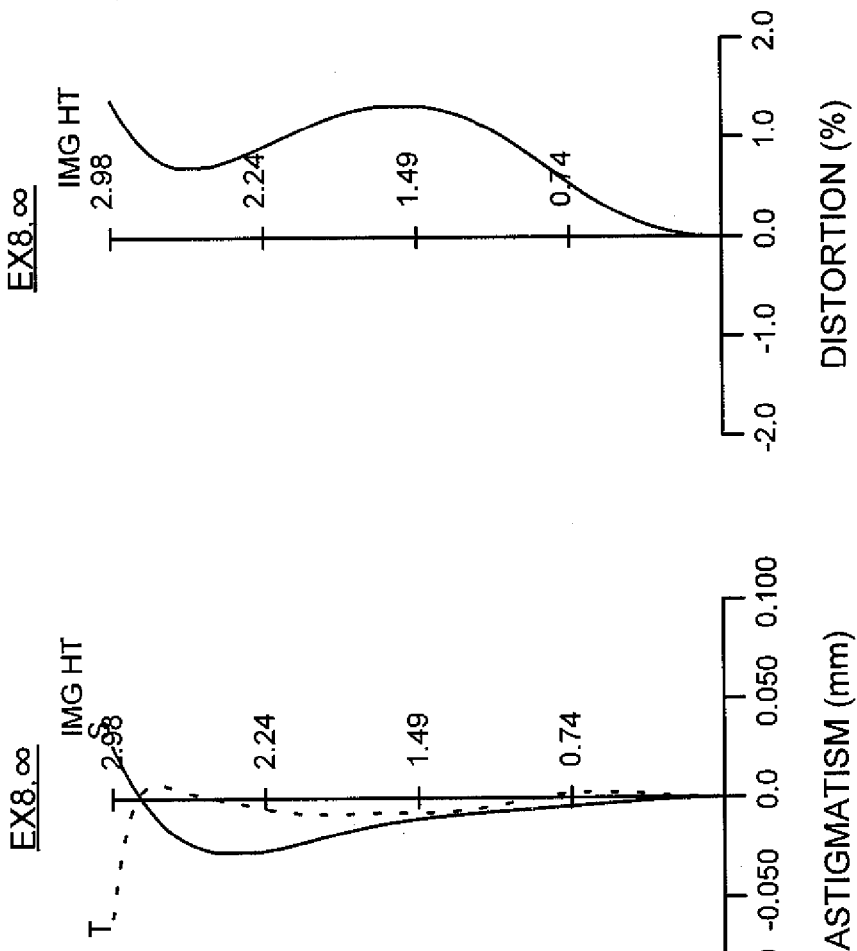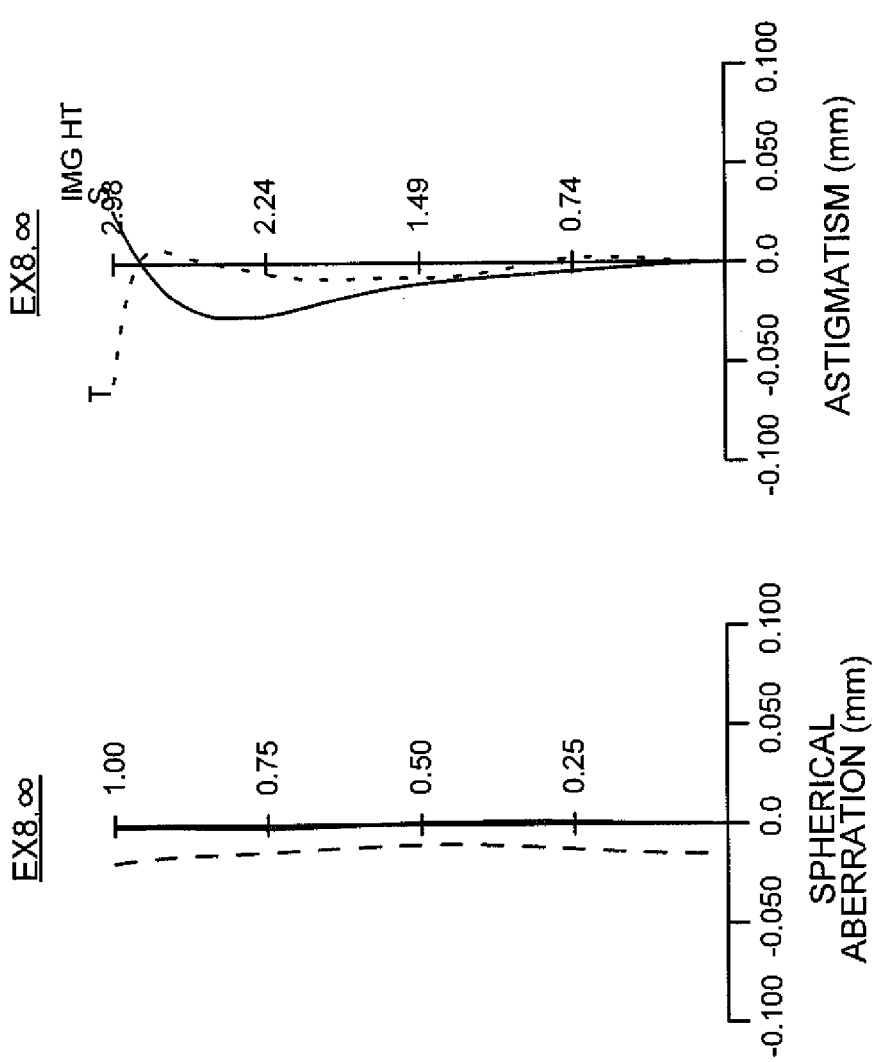

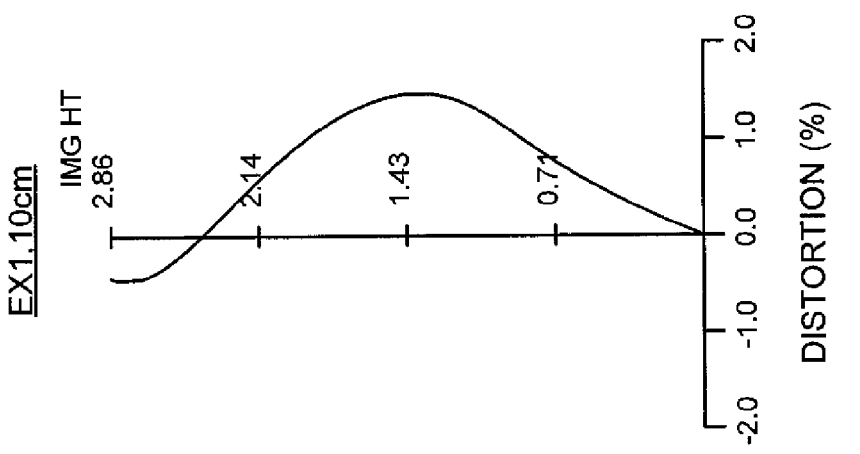
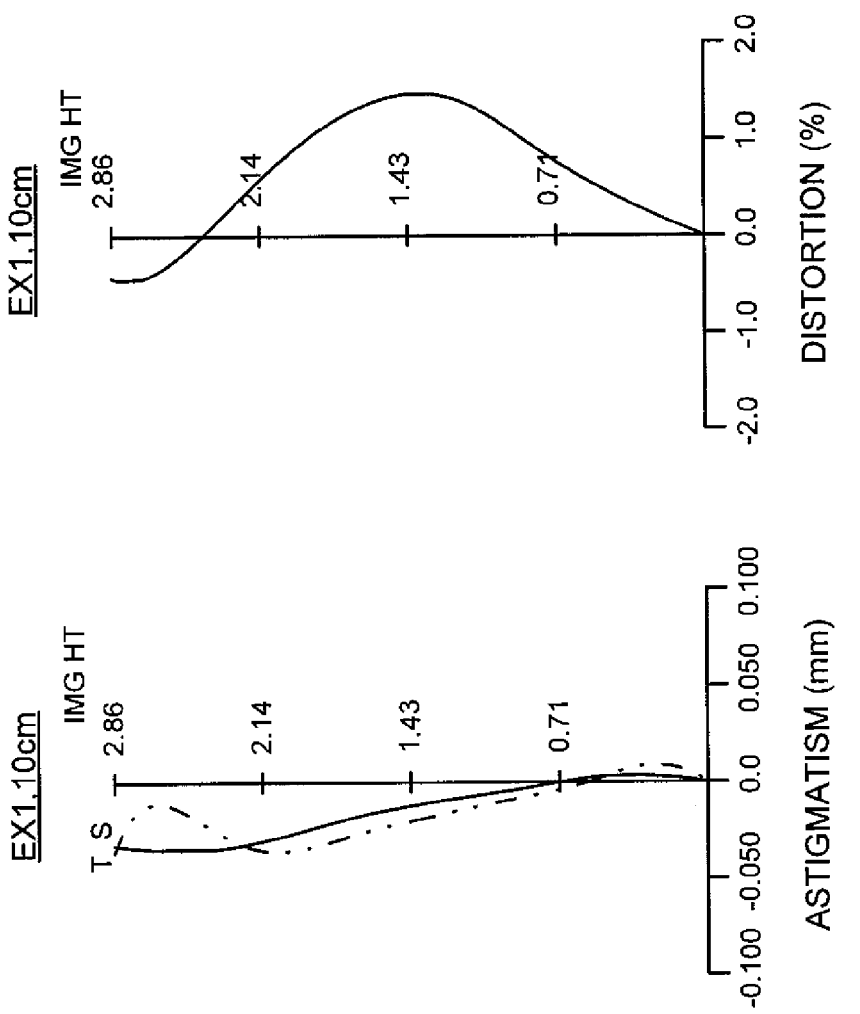
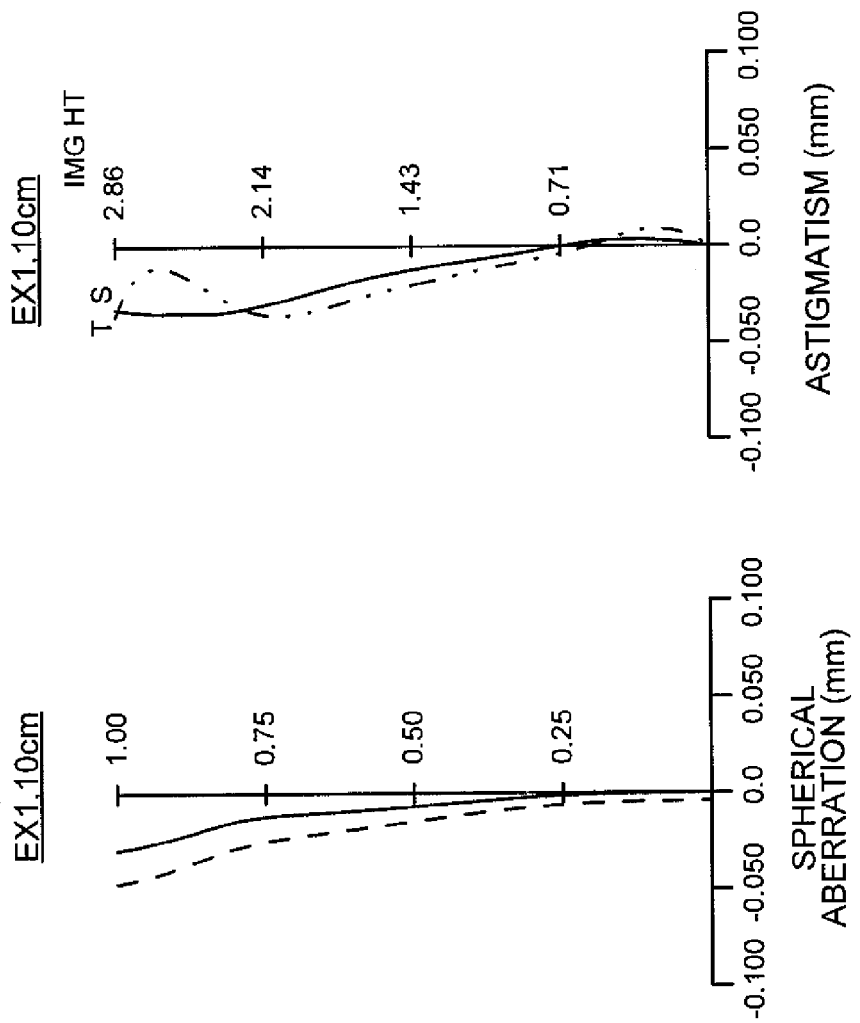

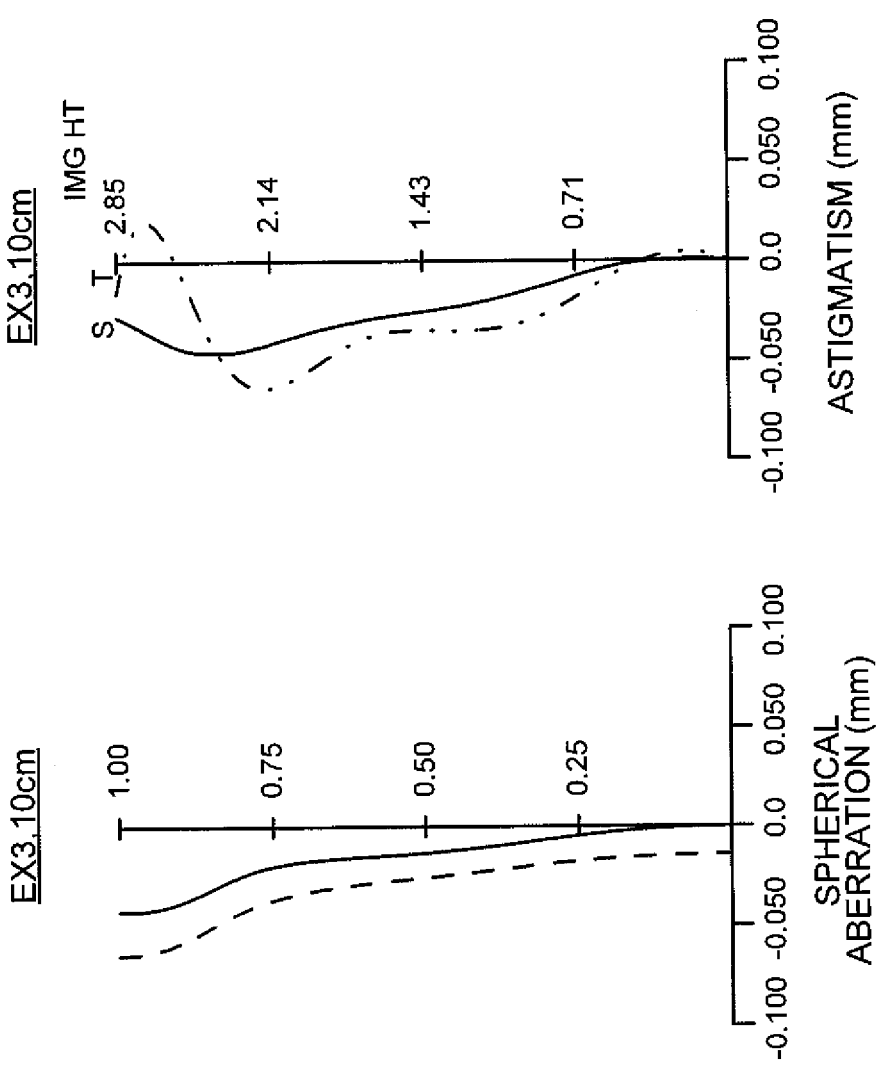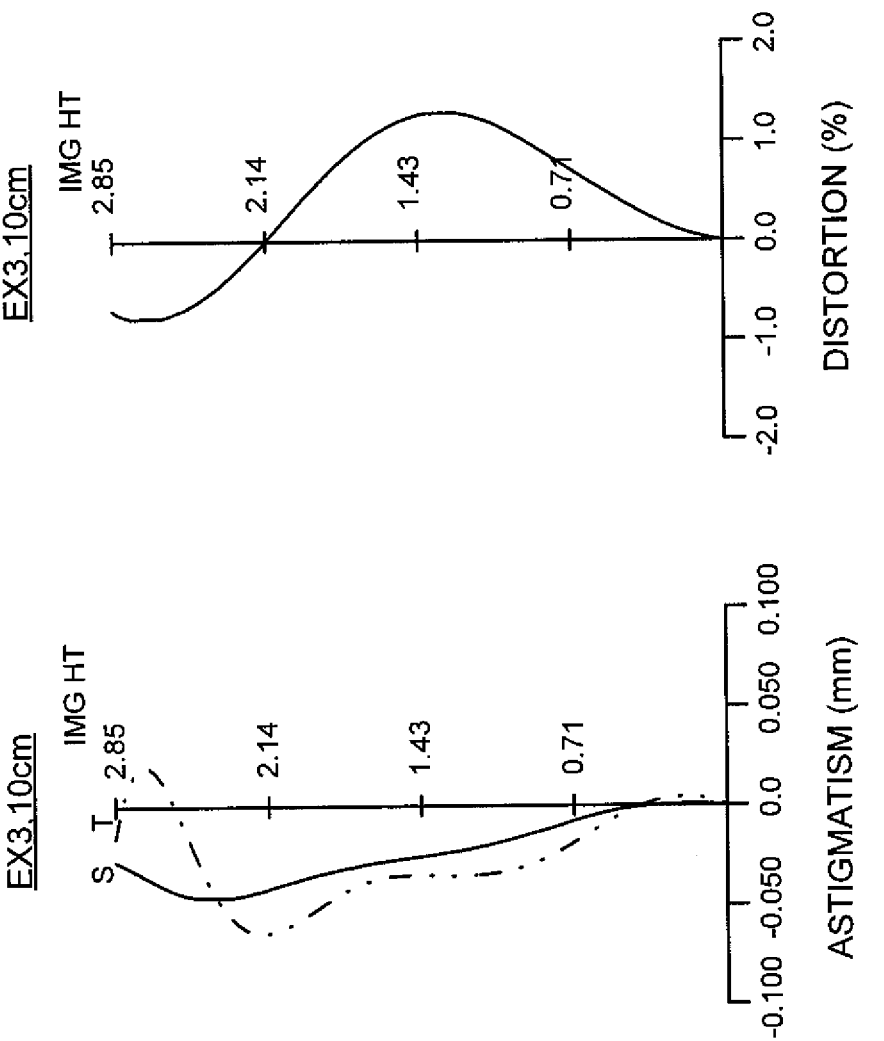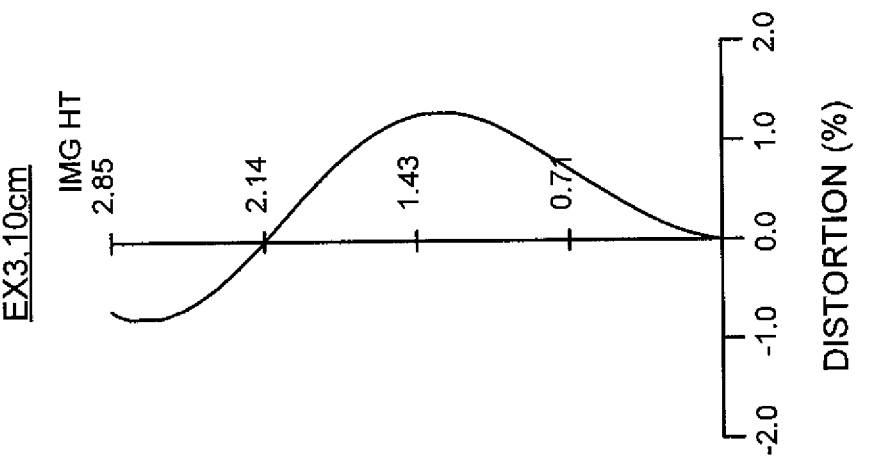

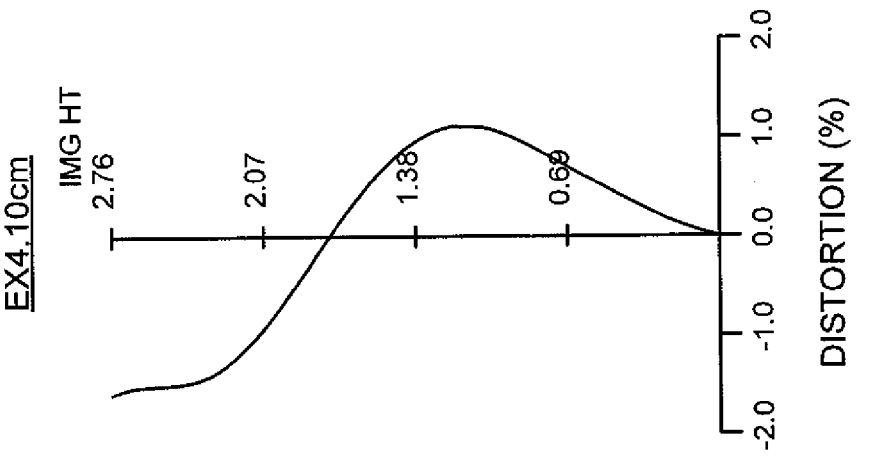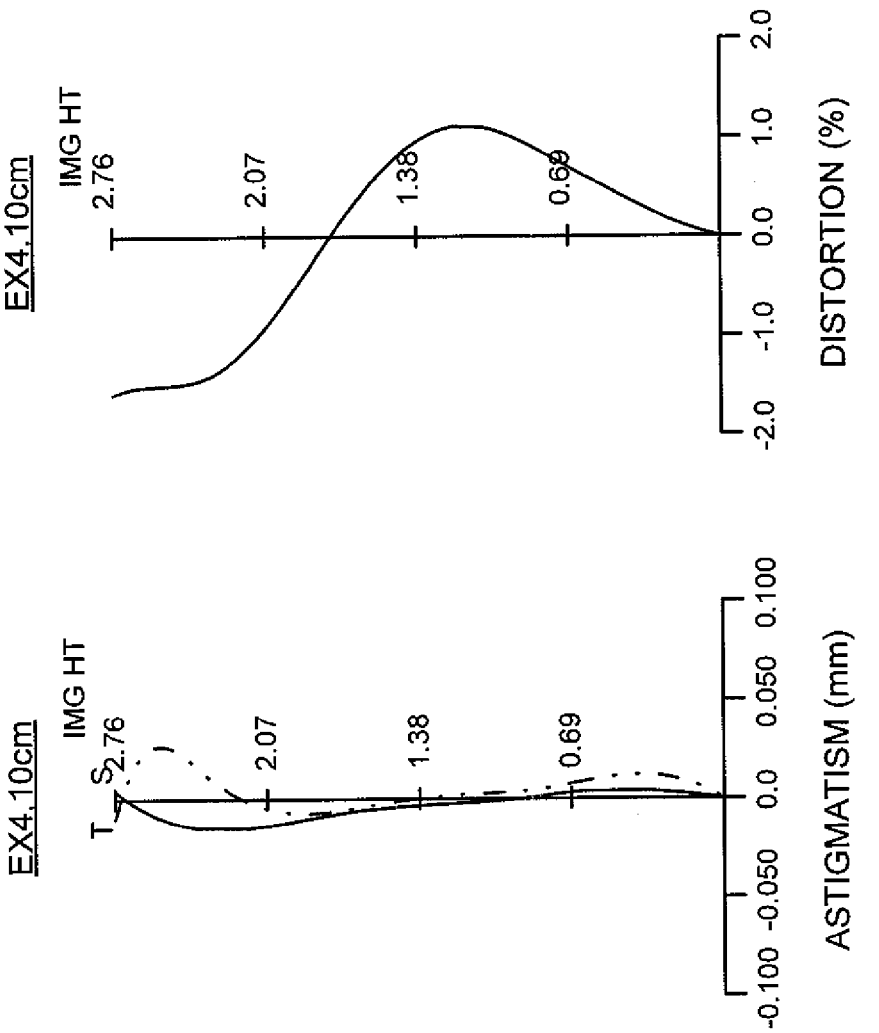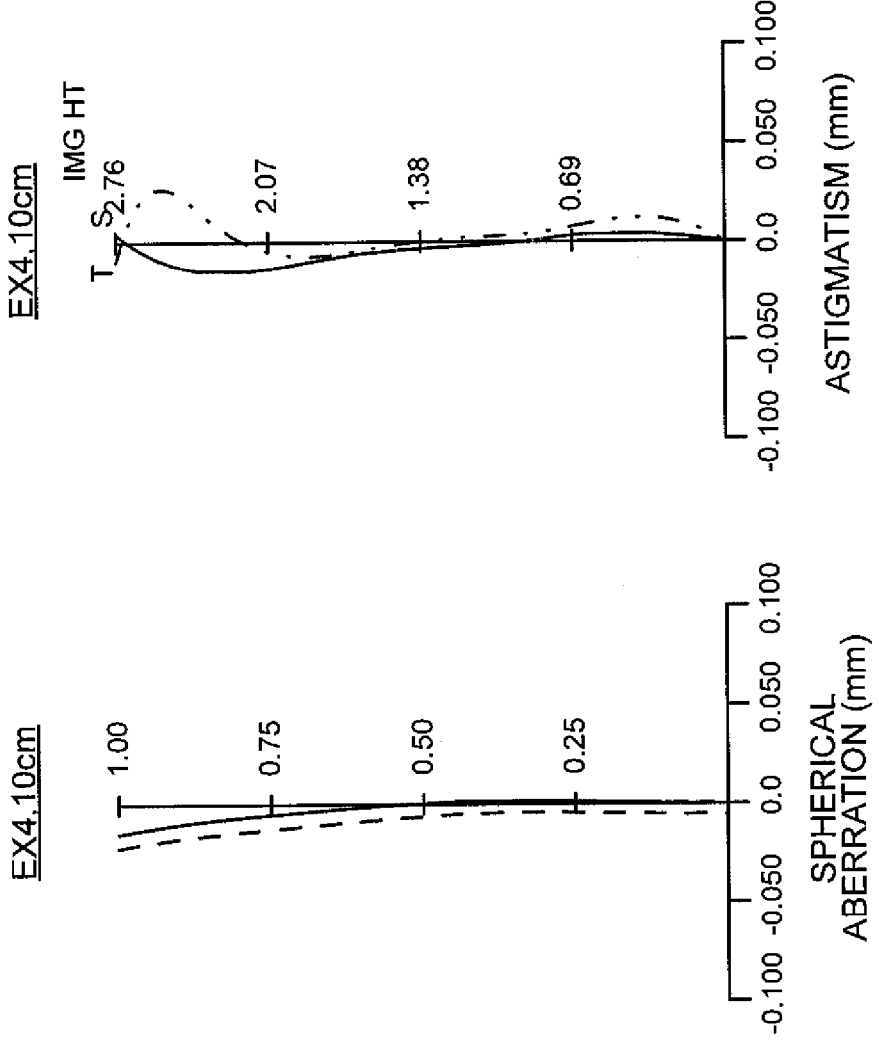

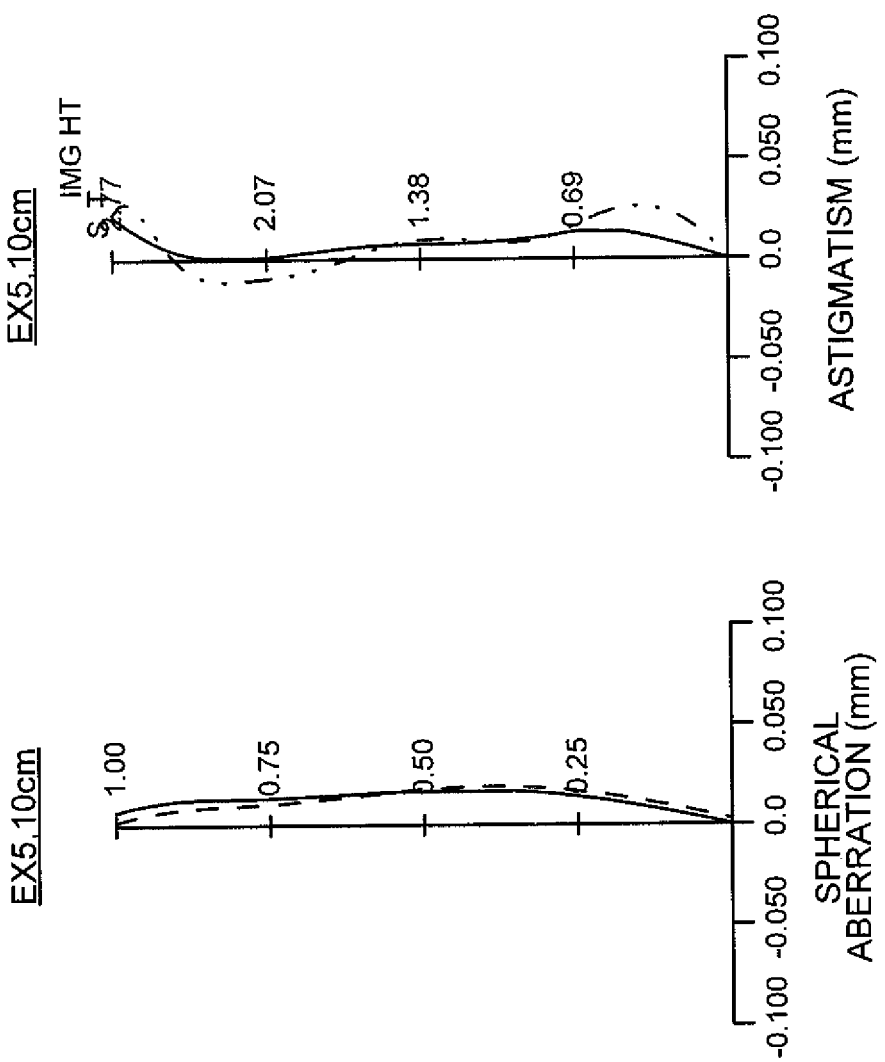
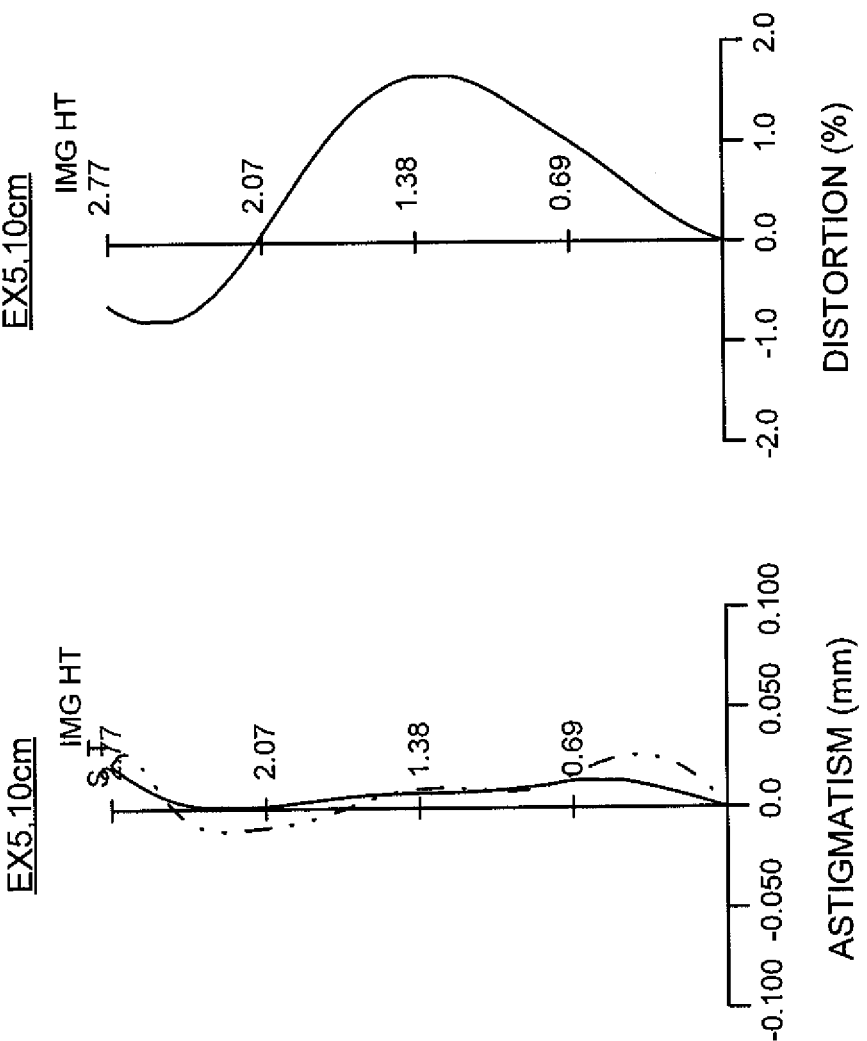
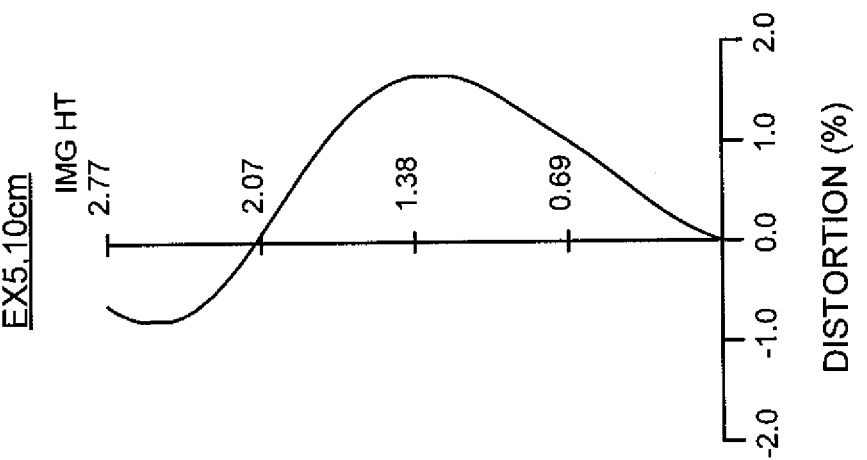

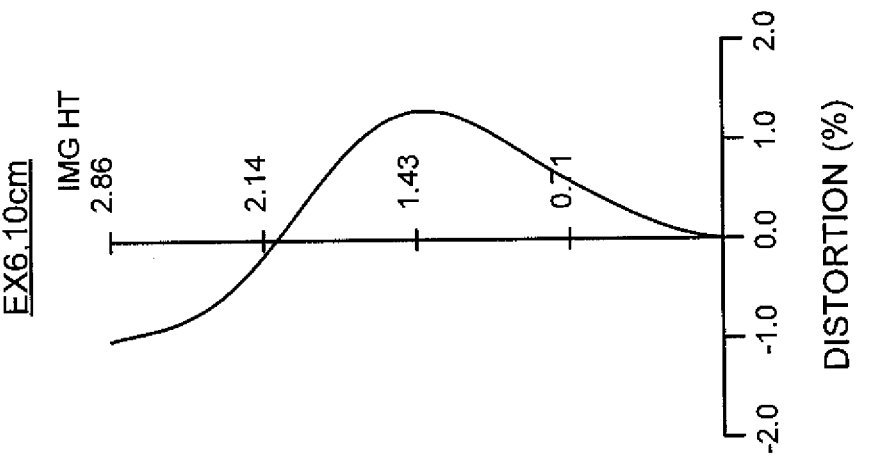
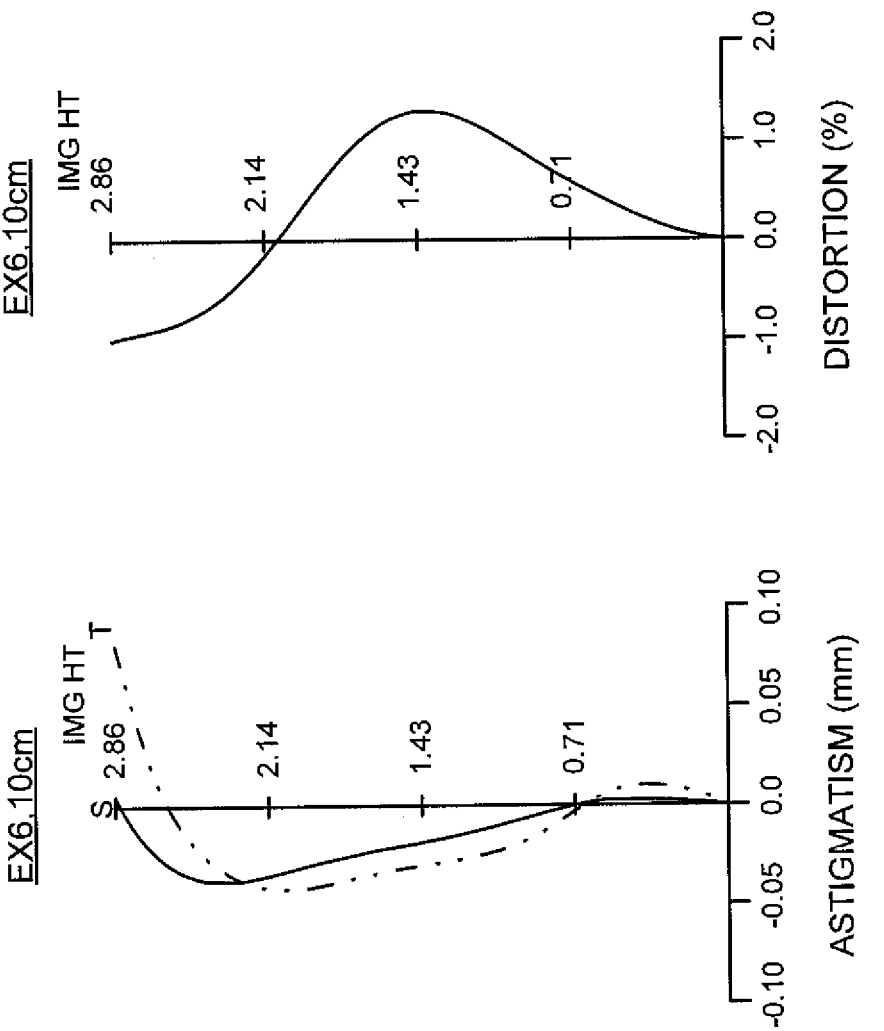
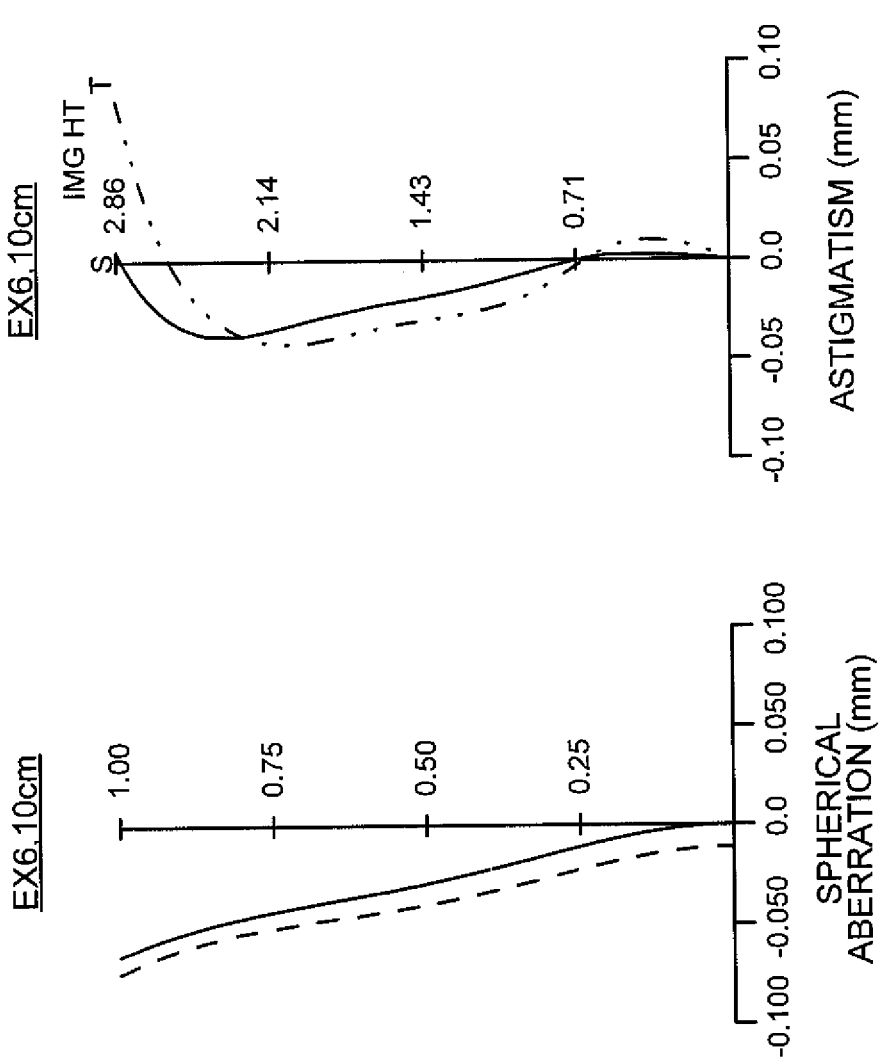

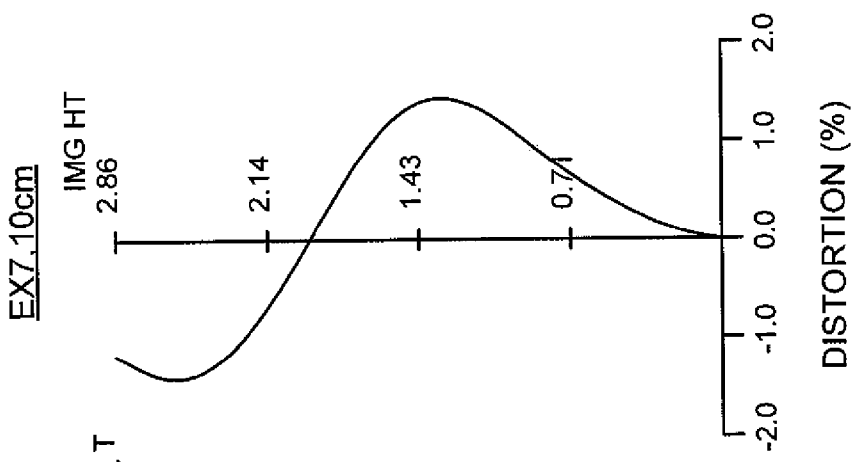
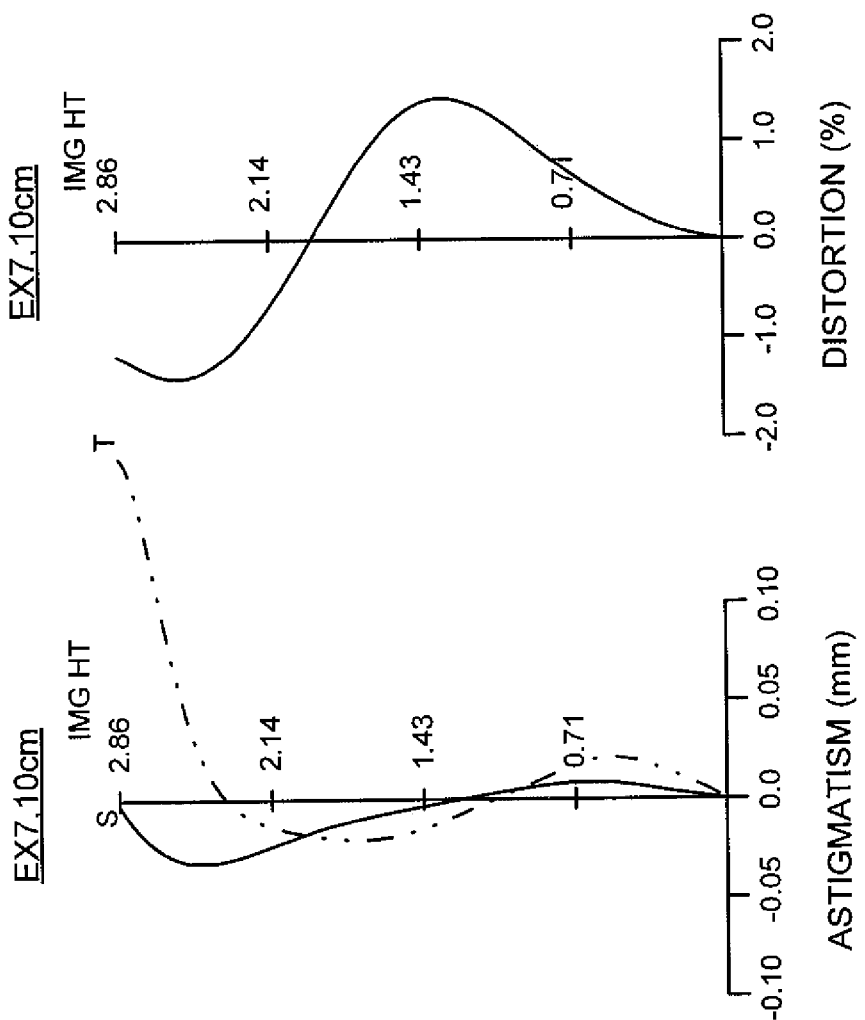
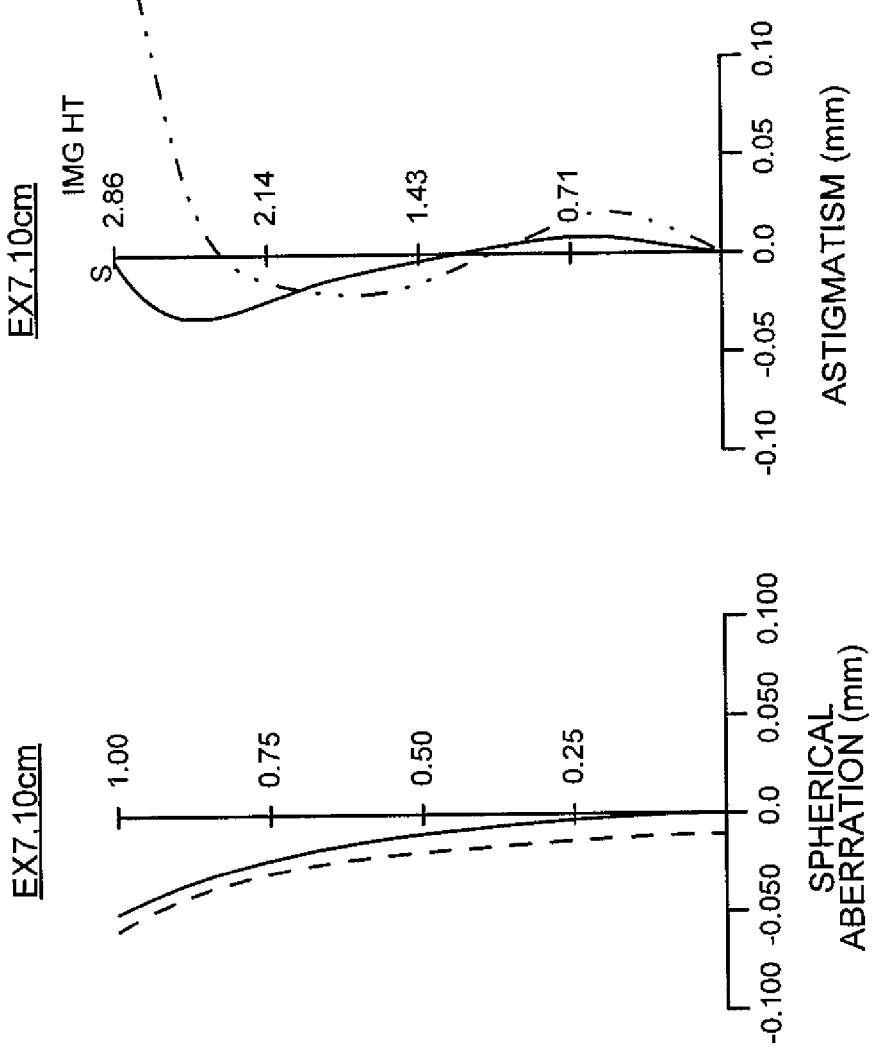

IMAGING LENS SYSTEM, IMAGING OPTICAL DEVICE, AND DIGITAL APPLIANCE

RELATED APPLICATIONS

This is a U.S. National Phase Application under 35 USC 371 of International Application PCT/JP2011/056738 filed on Mar. 22, 2011.

This application claims the priority of Japan Application No. 2010-073145 filed Mar. 26, 2010, the entire content of which is hereby incorporated by reference.

TECHNICAL FIELD

The present invention relates to imaging lens systems, imaging optical devices, and digital appliances. More particularly, the present invention relates to imaging optical devices that capture video of a subject with an image sensor (for example, a solid-state image sensor such as a CCD (charge-coupled device) image sensor or a CMOS (complementary metal-oxide semiconductor) image sensor, digital appliances that incorporate such an imaging optical device and are thereby furnished with an image input capability, and compact imaging lens systems that form an optical image of a subject on the sensing surface of an image sensor.

BACKGROUND ART

In recent years, as image sensors are made increasingly high-performance and compact, digital appliances furnished with an image input capability, such as cellular phones and portable information terminals provided with an imaging optical device, have been becoming more and more popular. And there have been increasing demands for further compactness and higher performance in imaging lens systems incorporated in imaging optical devices. Imaging lens systems for such applications conventionally have a three-element or four-element construction; today there are also proposed imaging lens systems having a five-element constructions.

As further compactness is aimed at as mentioned above, the exit pupil position comes closer to the image sensor. This increases the angle of incidence of image-side peripheral rays with respect to the image sensor, and causes shading, diminishing the amount of light. As a means for solving the problem, Patent Document 1 listed below proposes an imaging lens system having a five-element construction in which an aspherically shaped lens element having an inflection point elsewhere than at the intersection with the optical axis is used to achieve telecentricity in image-side rays. Imaging lens systems having a four-element construction are seen, for example, in Patent Documents 2 and 3 listed below.

LISTS OF CITATIONS

Patent Literature

Patent Document 1: JP-A-2007-264180
Patent Document 2: JP-A-2007-108534
Patent Document 3: JP-A-2008-76953

SUMMARY OF INVENTION

Technical Problem

With an aspherically shaped lens element having an inflection point as disclosed in Patent Document 1, the refractive power near the optical axis greatly differs from that in the periphery, and this greatly affects curvature of field. In a construction including such an aspherically shaped lens element, when an object at a finite distance is shot, even with a conventional construction that involves the moving of all lens groups, focusing is possible at the center of the image field; inconveniently, however, since the rays incident on the aspherically shaped lens element having an inflection point vary, the image field "runs away" in the periphery.

The imaging lens system disclosed in Patent Document 2 is so configured as to focus on an object at a finite distance by moving part of the imaging lens system, and aims at making the driving device compact by mainly moving the first lens element alone. The imaging lens system disclosed in Patent Document 3 is so configured as to focus by moving, in a four-element construction, the second lens element alone. Inconveniently, however, the optical systems disclosed in Patent Documents 2 and 3 more suffer, than enjoy the advantages of the modified focusing methods, from disadvantages such as lower optical performance resulting from an increased burden on the optical system, an increased optical total length, a slower f-number, and a less close close-up distance.

Devised against the background discussed above, the present invention aims to provide an imaging lens system that has suppressed variation in curvature of field during focusing on a finite-distance object, that is compact and is fast enough with an f-number of about 2.4, and that has properly corrected aberrations, and to provide an imaging optical device and a digital appliance that are provided with such an imaging lens system.

Solution to Problem

To achieve the above object, according to a first aspect of the invention, a single-focal-length imaging lens system is composed of, in order from the object side, a first lens group, a second lens group, and a third lens group. The imaging lens system performs focusing by, while keeping the first and third lens groups stationary relative to the image plane, moving the second lens group in the optical axis direction. The second lens group includes at least one positive lens element. The third lens group includes at least one aspherically shaped lens element having an inflection point at a position other than the intersection with the optical axis. The air lens formed by the interval between the first and second lens groups have a negative refractive power. The air lens formed by the interval between the second and third lens groups has a positive refractive power. Conditional formula (1) below is fulfilled;

$$0 \le |Fi1/Fi2| - |Fm1/Fm2| \le 10 \quad (1)$$

where, when the air lens formed by the interval between the first and second lens groups is referred to as the first air lens, and the air lens formed by the interval between the second and third lens groups is referred to as the second air lens, then Fi1 represents the focal length of the first air lens when focusing on the infinite object distance;
Fi2 represents the focal length of the second air lens when focusing on the infinite object distance;
Fm1 represents the focal length of the first air lens when focusing on the closest object distance; and
Fm2 represents the focal length of the second air lens when focusing on the closest object distance.

According to a second aspect of the invention, in the imaging lens system according to the first aspect described above, conditional formula (1a) below is fulfilled:

$$0 \le |Fi1/Fi2| - |Fm1/Fm2| \le 3 \quad (1a)$$

According to a third aspect of the invention, in the imaging lens system according to the first or second aspect described above, conditional formula (2) below is fulfilled:

$$0.1 < fg2/f < 2 \quad (2)$$

where fg2 represents the focal length of the second lens group; and f represents the focal length of the entire imaging lens system.

According to a fourth aspect of the invention, in the imaging lens system according to any one of the first to third aspects described above, conditional formula (2a) below is fulfilled:

$$0.5 < fg2/f < 1.5 \quad (2a)$$

where fg2 represents the focal length of the second lens group; and f represents the focal length of the entire imaging lens system.

According to a fifth aspect of the invention, in the imaging lens system according to any one of the first to fourth aspects described above, an aperture stop is located within the first lens group.

According to a sixth aspect of the invention, in the imaging lens system according to any one of the first to fifth aspects described above, conditional formula (3) below is fulfilled:

$$1.0 < fg1/f < 3.0 \quad (3)$$

where fg1 represents the focal length of the first lens group; and f represents the focal length of the entire imaging lens system.

According to a seventh aspect of the invention, in the imaging lens system according to any one of the first to sixth aspects described above, conditional formula (3a) below is fulfilled:

$$1.3 < fg1/f < 2.0 \quad (3a)$$

where fg1 represents the focal length of the first lens group; and f represents the focal length of the entire imaging lens system.

According to an eighth aspect of the invention, in the imaging lens system according to any one of the first to seventh aspects described above, the first lens group includes at least one positive lens element and at least one negative lens element.

According to a ninth aspect of the invention, in the imaging lens system according to any one of the first to eighth aspects described above, the first lens group is composed of, in order from the object side, a first lens element having a positive refractive power and convex to the object side and a second lens element having a negative refractive power and concave to the image side, the second lens group is composed of, in order from the object side, a third lens element convex to the object side and a fourth lens element having a positive refractive power and convex to the image side, and the third lens group is composed of a fifth lens element having a negative refractive power and concave to the image side.

According to a tenth aspect of the invention, in the imaging lens system according to any one of the first to ninth aspects described above, conditional formula (4) below is fulfilled:

$$0.1 < f1/f < 1.26 \quad (4)$$

where f1 represents the focal length of a lens element disposed at the most object-side position; and f represents the focal length of the entire imaging lens system.

According to an eleventh aspect of the invention, in the imaging lens system according to any one of the first to tenth aspects described above, conditional formula (4a) below is fulfilled:

$$0.4 < f1/f < 1.1 \quad (4a)$$

where f1 represents the focal length of the most object-side lens element; and f represents the focal length of the entire imaging lens system.

According to a twelfth aspect of the invention, in the imaging lens system according to any one of the first to eleventh aspects described above, the first lens group has a positive refractive power, the second lens group has a positive refractive power, and the third lens group has a negative refractive power.

According to a thirteenth aspect of the invention, in the imaging lens system according to any one of the first to twelfth aspects described above, all lens elements are formed of a plastic material.

According to a fourteenth aspect of the invention, an imaging optical device is provided with the imaging lens system according to any one of the first to thirteenth aspects described above, and an image sensor which converts an optical image formed on an imaging area into an electrical signal. The imaging lens system is arranged such that an optical image of a subject is formed on the imaging area of the image sensor.

According to a fifteenth aspect of the invention, a digital appliance incorporates the imaging optical device according to any one of the first to fourteenth aspects described above so as to be additionally furnished with at least one of the functions of shooting a still image of the subject and the functions of shooting a moving image of the subject.

According to a sixteenth aspect of the invention, in the digital appliance according to the fifteenth aspect described above, the digital appliance is a portable terminal.

Advantageous Effects of the Invention

Adopting a construction according to the present invention makes it possible to realize an imaging lens system that has suppressed variation in curvature of field during focusing on a finite-distance object, that is compact and is fast enough with an f-number of about 2.4, and that has properly corrected aberrations, and to realize an imaging optical device provided with such an imaging lens system. Incorporating an imaging optical device according to the present invention in a digital appliance such as a cellular phone or a portable information terminal makes it possible to compactly add a high-performance image input capability to the digital appliance.

BRIEF DESCRIPTION OF DRAWINGS

FIG. 8 is an optical construction diagram of an eighth embodiment (Example 8) of the invention;

FIG. 9 comprises aberration diagrams of Example 1 when focusing on the infinite object distance;

FIG. 10 comprises aberration diagrams of Example 2 when focusing on the infinite object distance;

FIG. 11 comprises aberration diagrams of Example 3 when focusing on the infinite object distance;

FIG. 13 comprises aberration diagrams of Example 5 when focusing on the infinite object distance;

FIG. 14 comprises aberration diagrams of Example 6 when focusing on the infinite object distance;

FIG. 16 comprises aberration diagrams of Example 8 when focusing on the infinite object distance;

FIG. 17 comprises aberration diagrams of Example 1 when focusing on the closest object distance;

FIG. 19 comprises aberration diagrams of Example 3 when focusing on the closest object distance;

FIG. 20 comprises aberration diagrams of Example 4 when focusing on the closest object distance;

FIG. 21 comprises aberration diagrams of Example 5 when focusing on the closest object distance;

FIG. 22 comprises aberration diagrams of Example 6 when focusing on the closest object distance;

FIG. 23 comprises aberration diagrams of Example 7 when focusing on the closest object distance;

DESCRIPTION OF EMBODIMENTS

Figure 1:
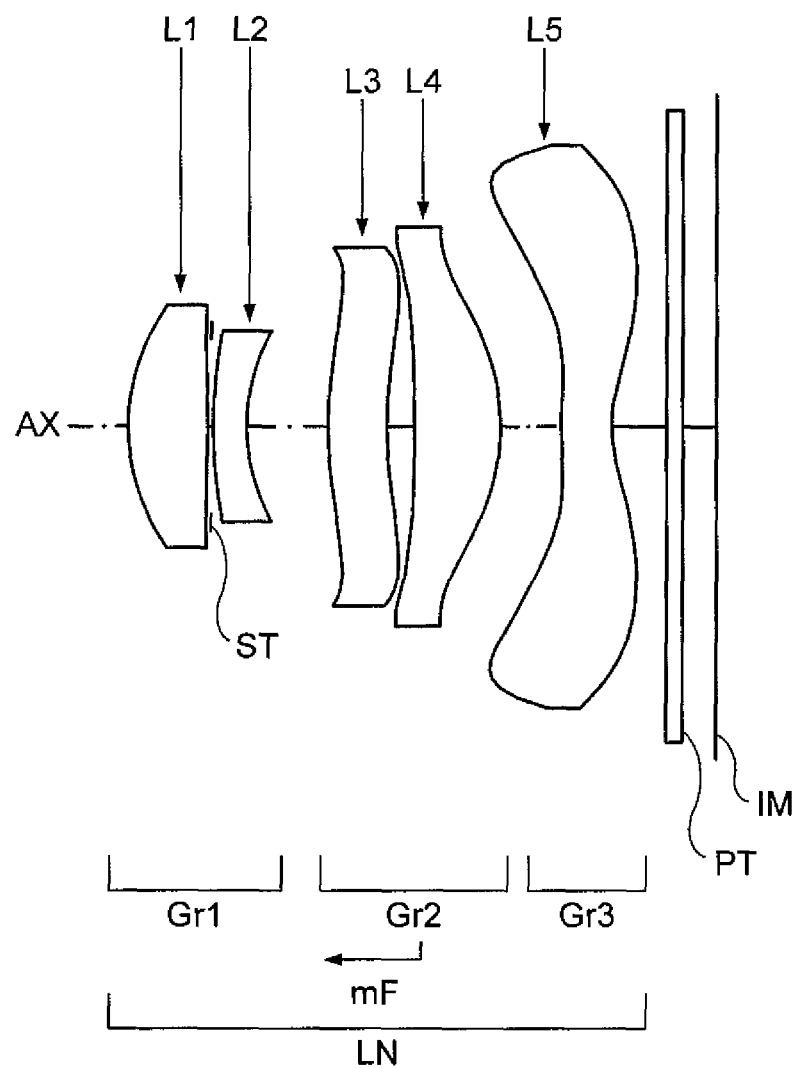
FIG. 1 is an optical construction diagram of a first embodiment (Example 1) of the invention.
Figure 2:
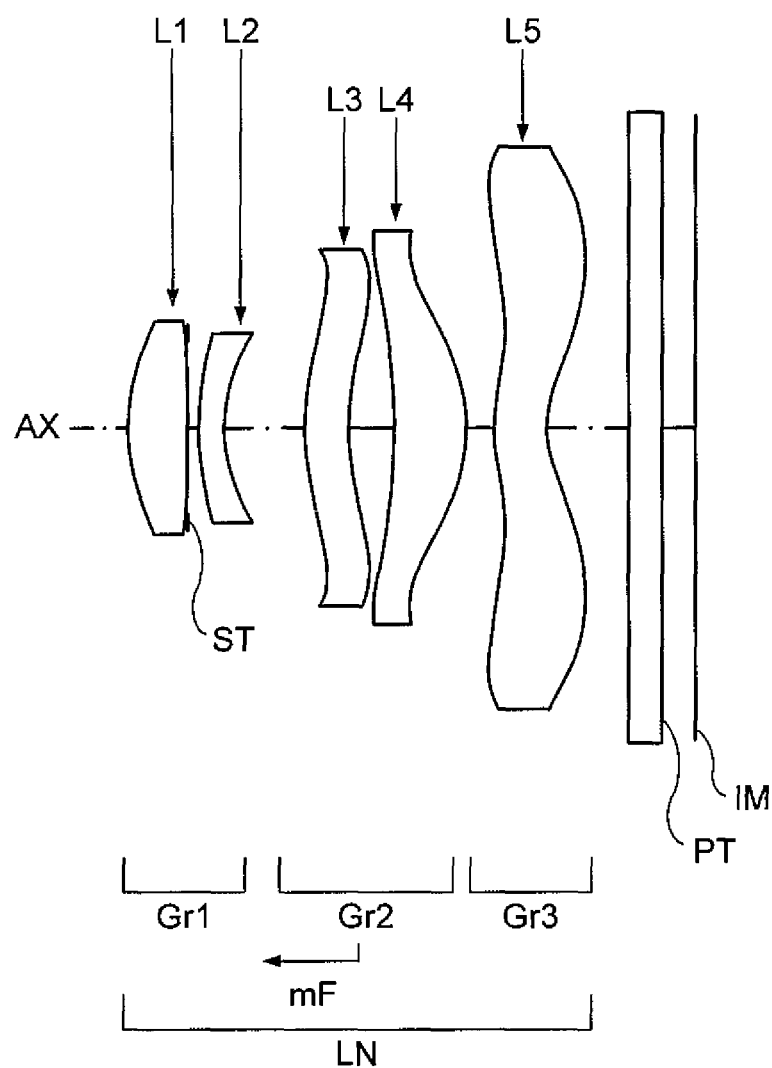
FIG. 2 is an optical construction diagram of a second embodiment (Example 2) of the invention.
Figure 3:
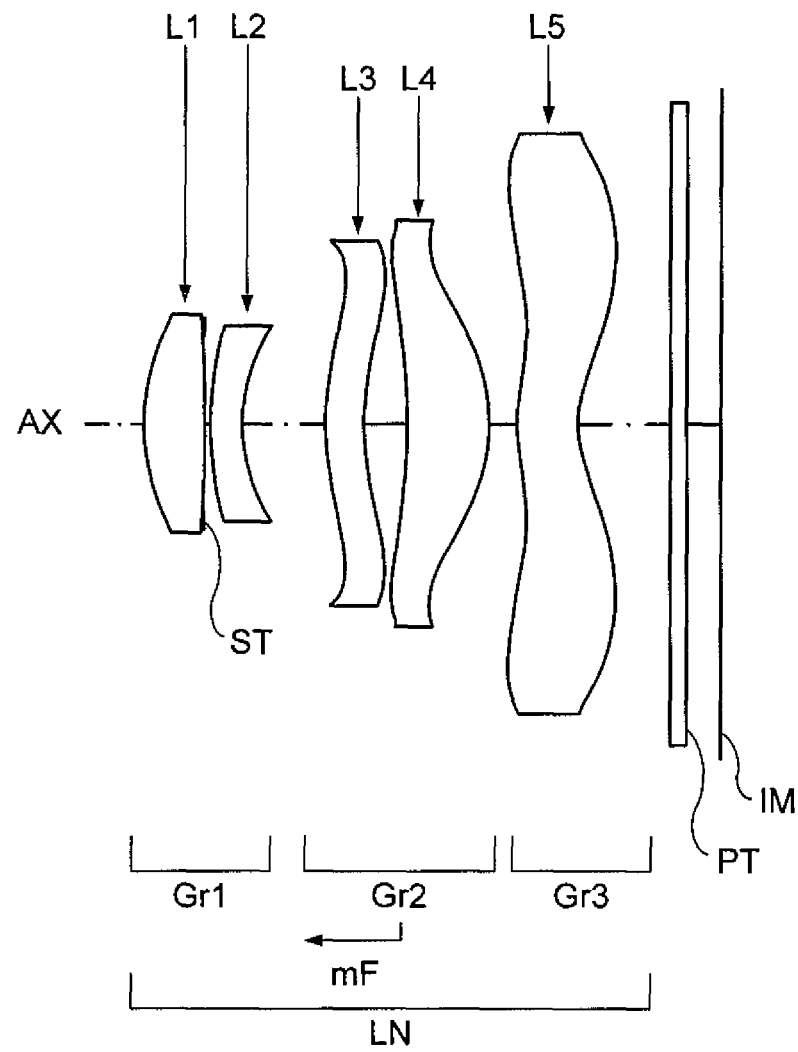
FIG. 3 is an optical construction diagram of a third embodiment (Example 3) of the invention.
Figure 4:
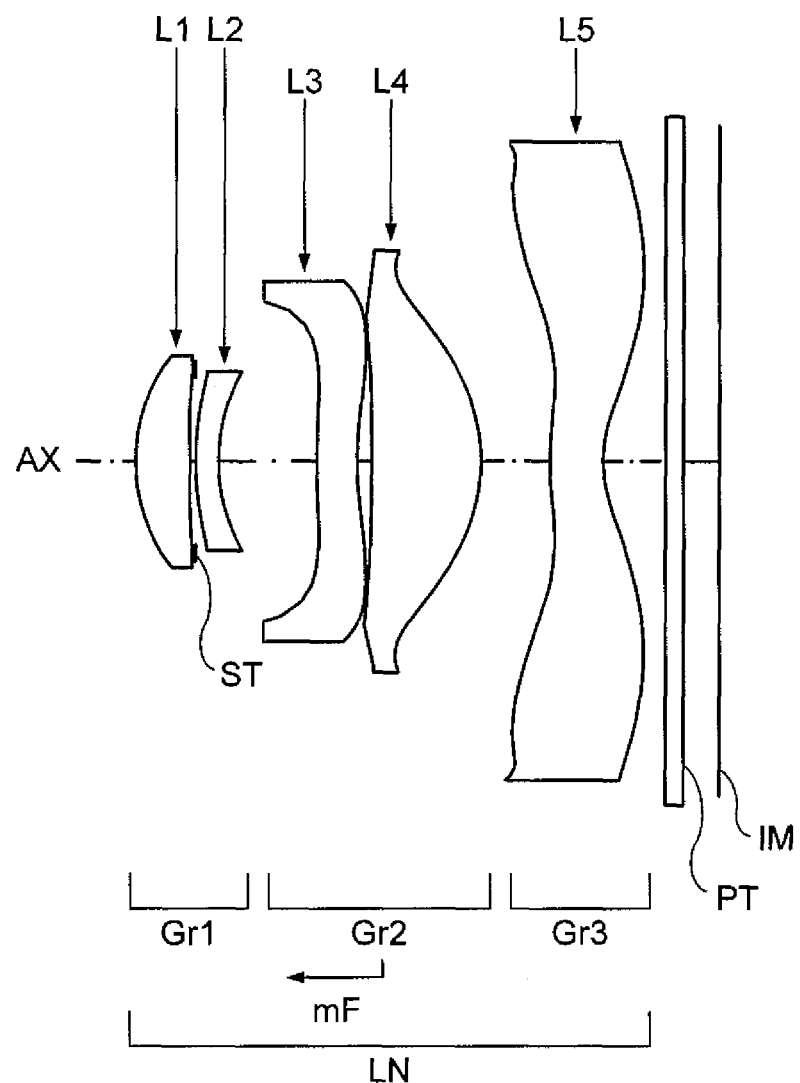
FIG. 4 is an optical construction diagram of a fourth embodiment (Example 4) of the invention.
Figure 5:
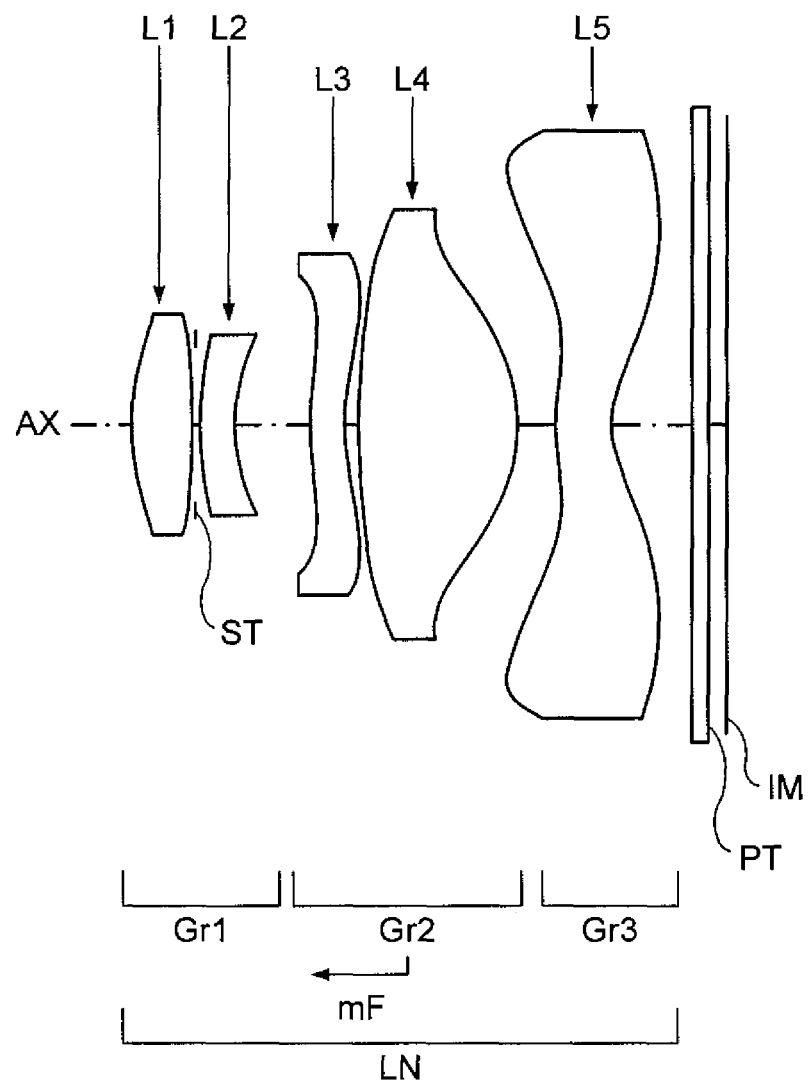
FIG. 5 is an optical construction diagram of a fifth embodiment (Example 5) of the invention.
Figure 6:
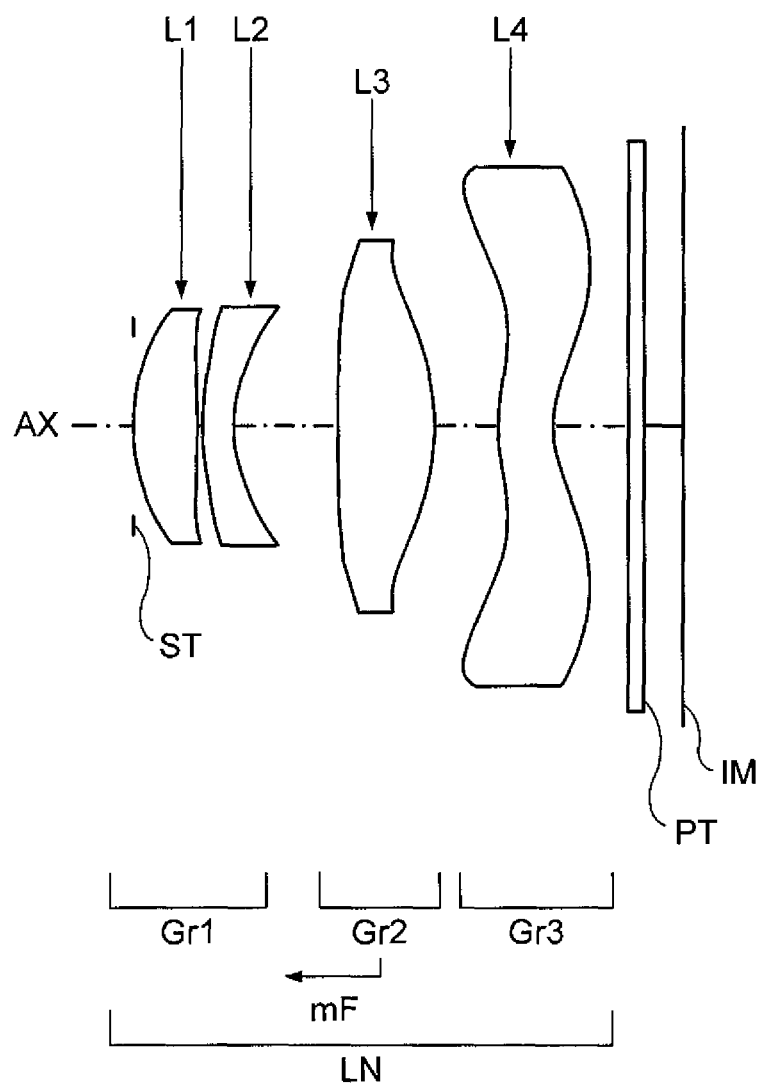
FIG. 6 is an optical construction diagram of a sixth embodiment (Example 6) of the invention.
Figure 7:
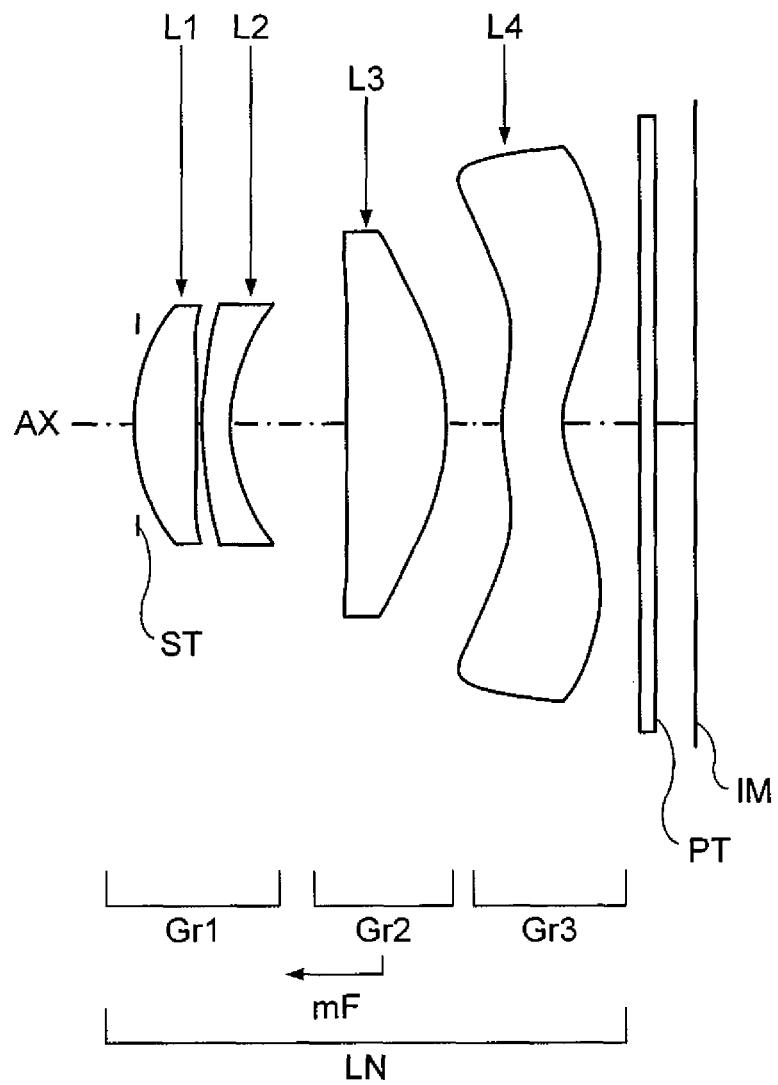
FIG. 7 is an optical construction diagram of a seventh embodiment (Example 7) of the invention.
Figure 12C:
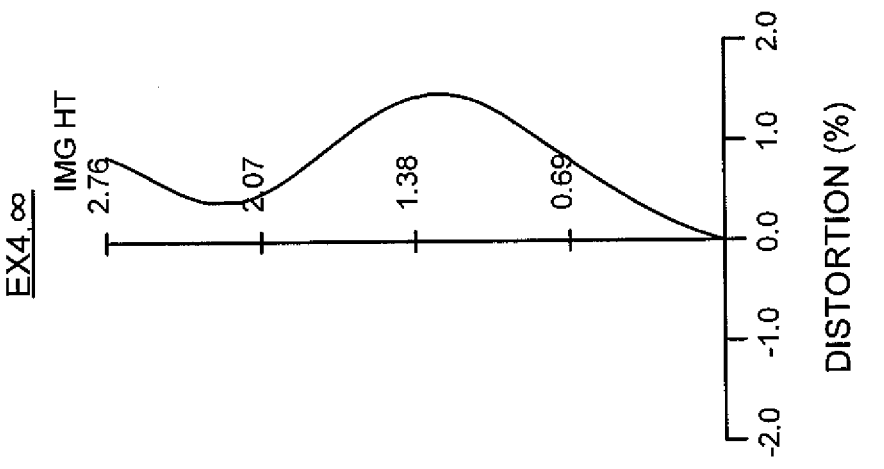
FIG. 12 comprises aberration diagrams of Example 4 when focusing on the infinite object distance.
Figure 12B:
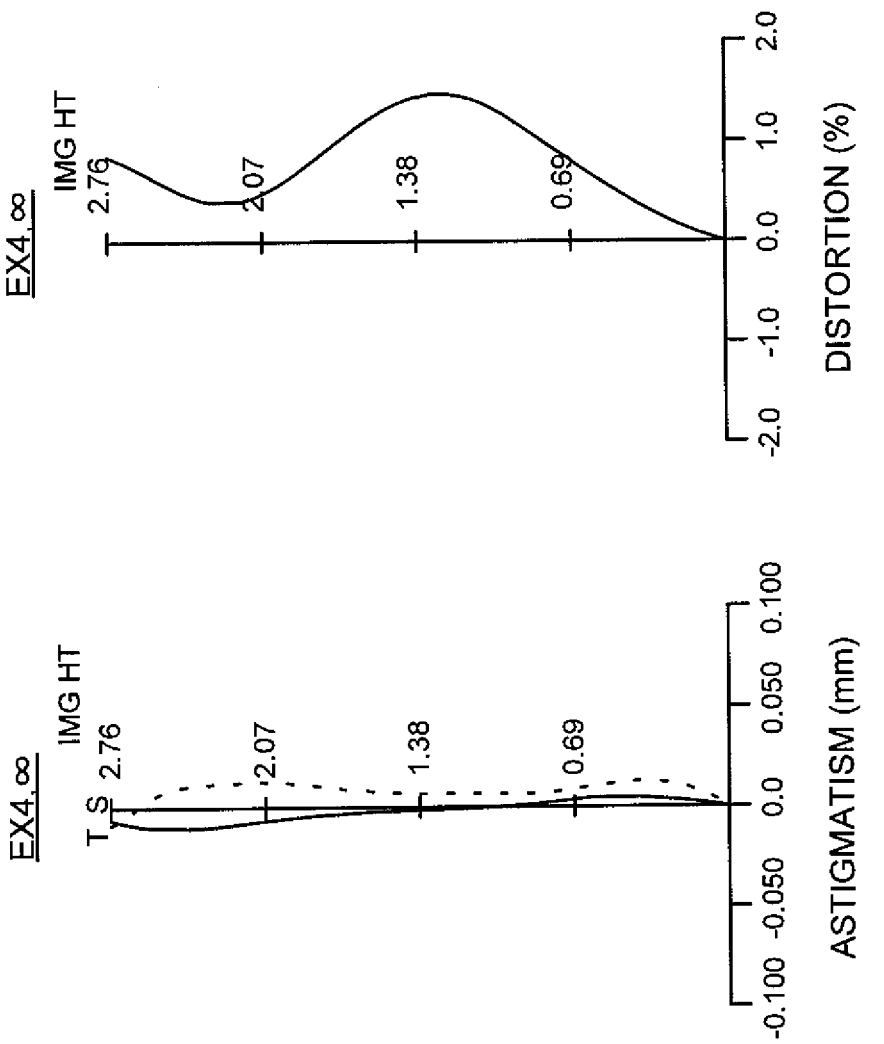
Figure 12A:
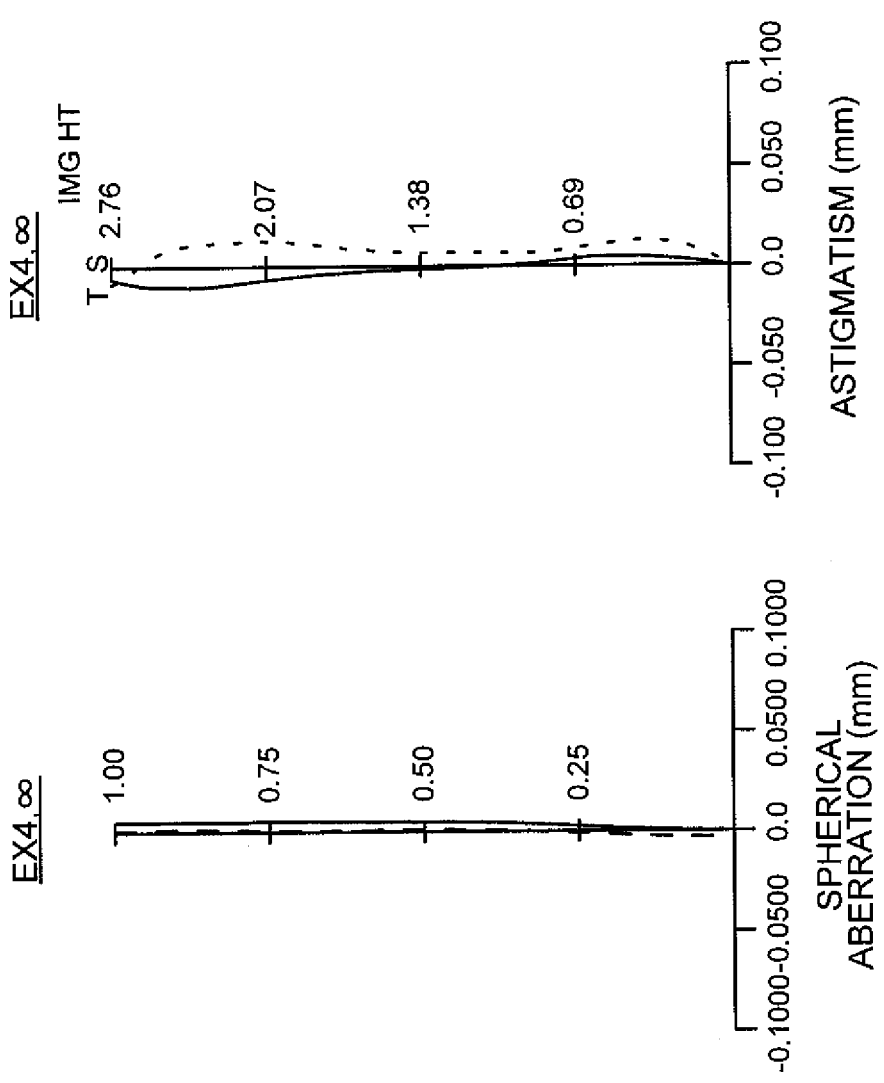
Figure 15A:
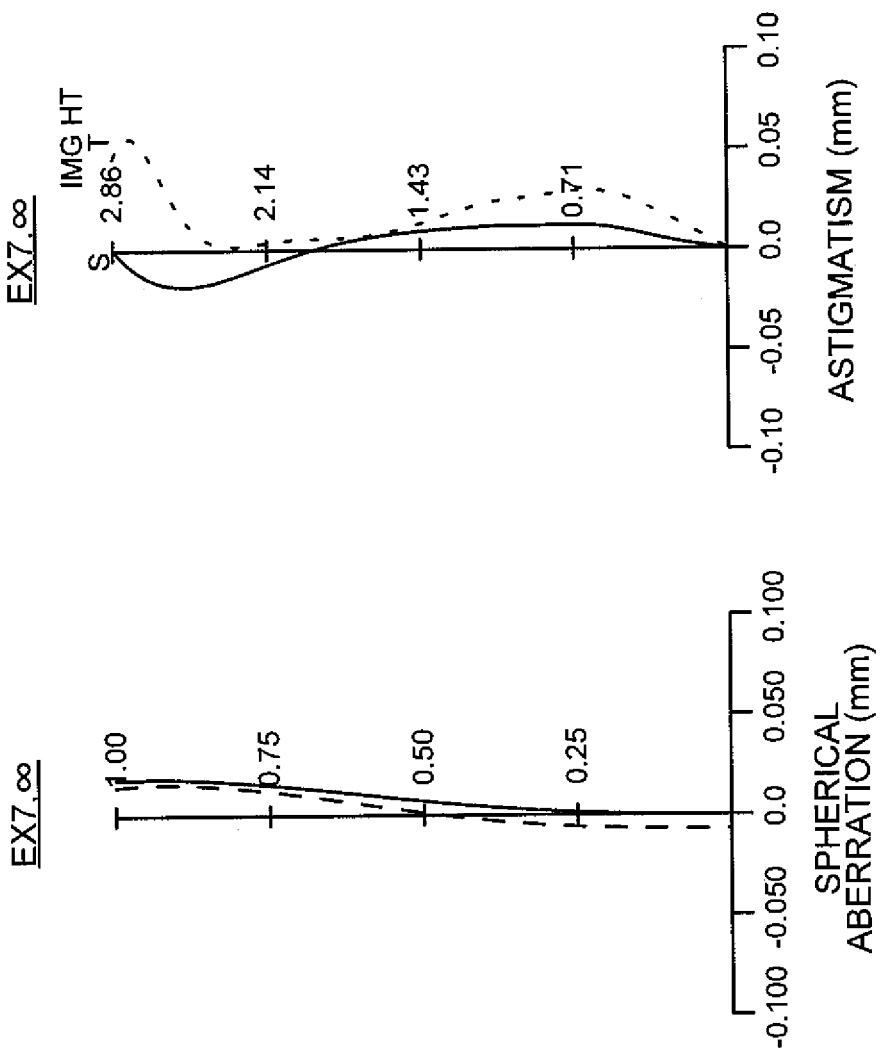
FIG. 15 comprises aberration diagrams of Example 7 when focusing on the infinite object distance.
Figure 15B:
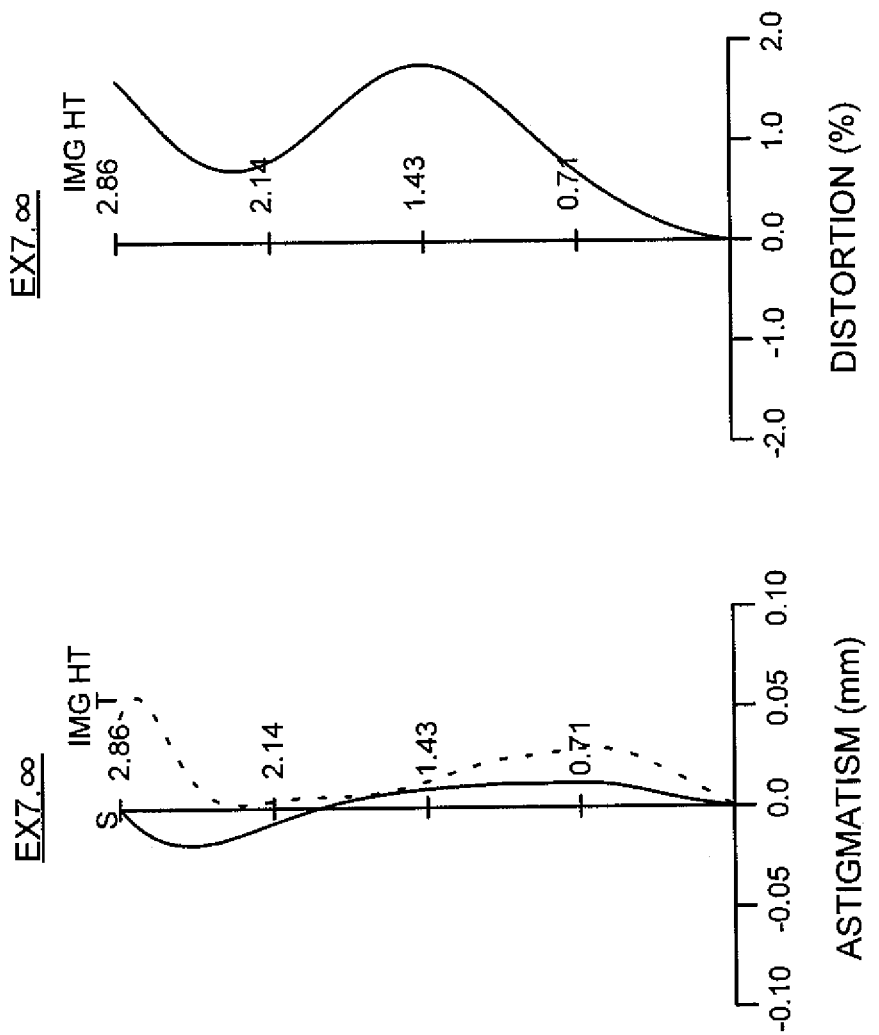
Figure 15C:
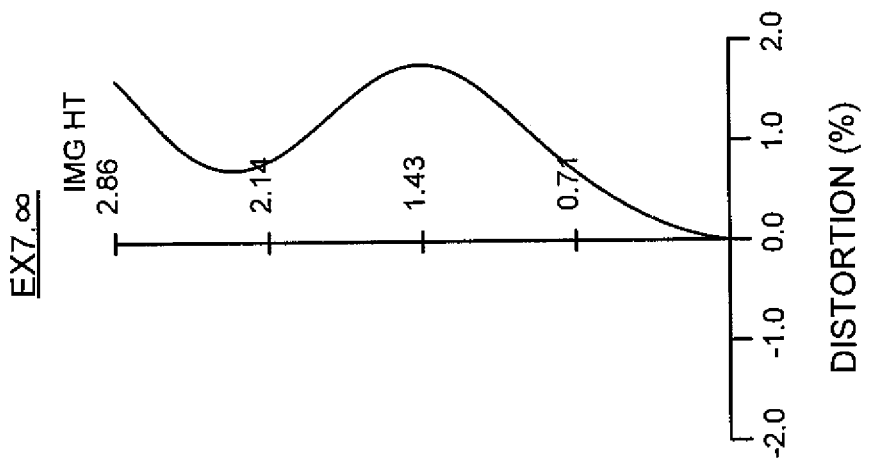
Figure 18C:
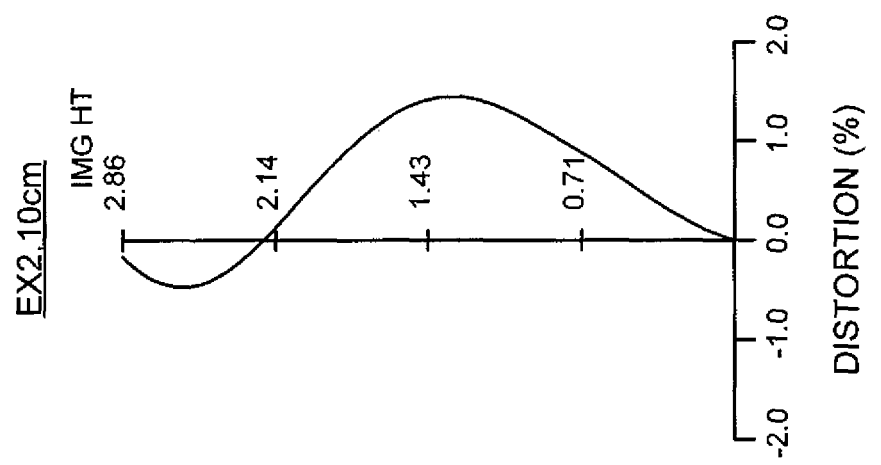
FIG. 18 comprises aberration diagrams of Example 2 when focusing on the closest object distance.
Figure 18B:
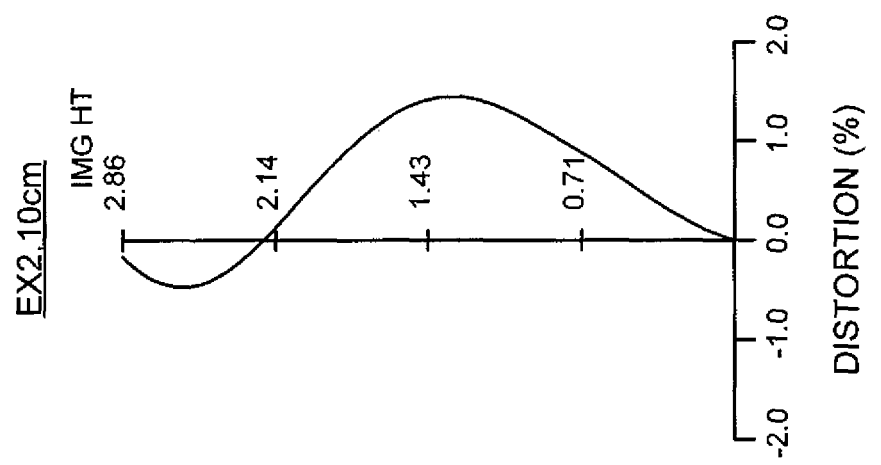
Figure 18A:
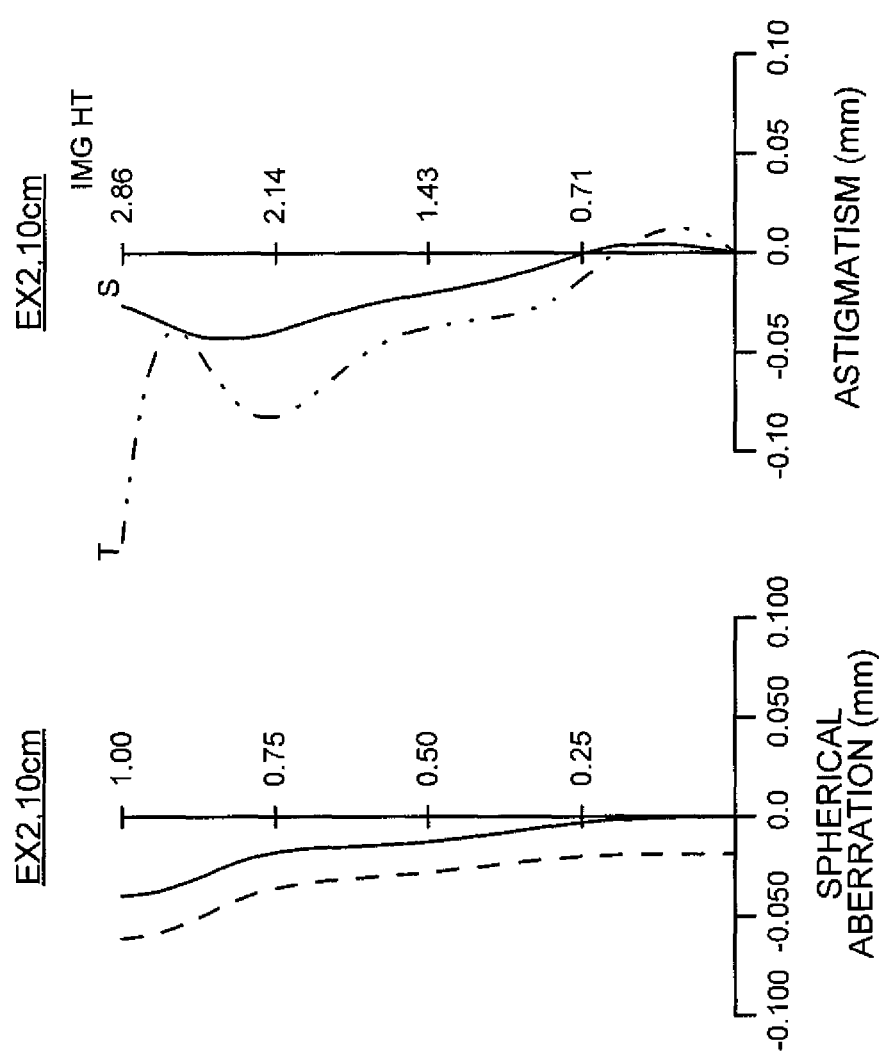
Figures 24A, 24B, 24C:
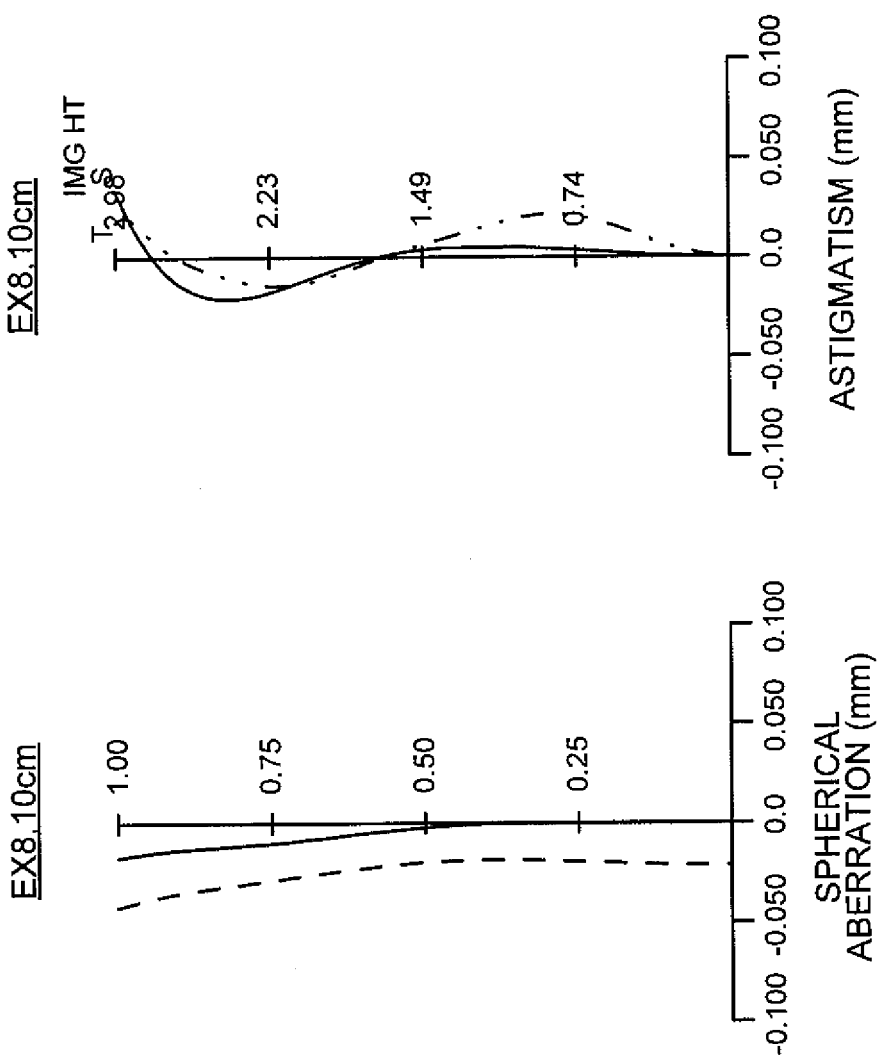
FIG. 24 comprises aberration diagrams of Example 8 when focusing on the closest object distance.

Hereinafter, imaging lens systems, imaging optical devices, digital appliances, etc. according to the present invention will be described. An imaging lens system according to the invention is a single-focal-length imaging lens system that is composed of, in order from the object side, a first lens group, a second lens group, and a third lens group and that performs focusing by, while keeping the first and third lens groups stationary relative to the image plane, moving the second lens group in the optical axis direction. The second lens group includes at least one positive lens element. The third lens group includes at least one aspherically shaped lens element that has an inflection point at a position other than the intersection with the optical axis. The air lens formed by the interval between the first and second lens groups has a negative refractive power. The air lens formed by the interval between the second and third lens groups has a positive refractive power. In addition, conditional formula (1) below is fulfilled.

$$0 \le |Fi1/Fi2| - |Fm1/Fm2| \le 10 \quad (1)$$

Here, when the air lens formed by the interval between the first and second lens groups is referred to as the first air lens, and the air lens formed by the interval between the second and third lens groups is referred to as the second air lens, then Fi1 represents the focal length of the first air lens when focusing on the infinite object distance;

Fi2 represents the focal length of the second air lens when focusing on the infinite object distance;

Fm1 represents the focal length of the first air lens when focusing on the closest object distance; and Fm2 represents the focal length of the second air lens when focusing on the closest object distance.

To obtain a compact, properly aberration-corrected imaging lens system while suppressing variation in curvature of field during focusing on a finite-distance object, an imaging lens system according to the invention, in its basic construction, is composed of, in order from the object side, a first lens group which is stationary relative to the image plane (that is, of which the distance relative to the image plane is constant), a second lens group which is movable in the optical axis direction for focusing, and a third lens group which is stationary relative to the image plane (that is, of which the distance relative to the image plane is constant), and adopts a focusing method that achieves focusing on a finite-distance object by movement of the second lens group in the optical axis direction.

The second lens group includes at least one positive lens element, and this makes it possible to correct curvature of field properly. The third lens group includes at least one aspherically shaped lens element, and this makes it possible to correct aberrations properly in the periphery of the image field. Adopting here an aspherical shape that has an inflection point at a position other than the intersection with the optical axis makes it easy to obtain satisfactory telecentricity in the image-side rays. Here, an "inflection point" denotes, with respect to a curve describing a sectional shape of a lens surface within its effective radius, a point on an aspherical surface where a plane tangent at a vertex thereof is perpendicular to the optical axis. An aspherically shaped lens element having an inflection point as describe above has greatly different refractive powers near the optical axis and in the periphery, and thus greatly affects curvature of field. In the construction according to the invention, during focusing on a finite-distance object, it is possible, by moving the second lens group, which is located on the object side of the above-mentioned aspherically shaped lens element, in the optical axis direction, to adjust the rays incident on the aspherically shaped lens element so as to suppress variation in curvature of field.

Conditional formula (1) defines a condition for, on one hand, suppressing variation in astigmatism by varying the focal lengths of the air lenses formed by the intervals between the lens groups simultaneously with focusing and, on the other hand, shortening the total length of the imaging lens system by properly setting the movement distance of the second lens group. Under the upper limit of conditional formula (1), compared with when focus is on an infinitely distant object, the focal length of the first, negative, air lens is not too short relative to that of the second, positive, air lens. This makes it possible to suppress the movement amount of the second lens group, and thus to shorten the total length of the imaging lens system. On the other hand, over the lower limit of conditional formula (1), it is possible to shorten, compared with when focus is on an infinitely distant object, the focal length of the first, negative, air lens relative to that of the second, positive, air lens; thus, by correcting the Petzval sum simultaneously with focusing, it is possible to suppress variation in astigmatism.

With the distinctive construction described above, it is possible to realize an imaging lens system that has suppressed variation in curvature of field during focusing on a finite-distance object, that is compact and is fast enough with an f-number of about 2.4, and that has properly corrected aberrations, and to realize an imaging optical device provided with such an imaging lens system. By incorporating such an imaging optical device in a digital appliance such as a cellular phone or a portable information terminal, it is possible to compactly add a high-performance image input capability to the digital appliance, and this contributes to making it compact, high-performance, versatile, etc. The conditions etc. for obtaining such benefits with a good balance, and for achieving still higher optical performance, further compactness, etc. will now be described.

It is further preferable that conditional formula (1a) below be fulfilled.

$$0 \le |Fi1/Fi2| - |Fm1/Fm2| \le 3 \quad (1a)$$

This conditional formula (1a) defines, within the conditional range defined by conditional formula (1) above, a further preferred conditional range from the above-mentioned and other standpoints. Accordingly, preferably, fulfilling conditional formula (1a) helps obtain more of the benefits mentioned above.

It is preferable that conditional formula (2) below be fulfilled.

$$0.1 < fg2/f < 2 \quad (2)$$

where fg2 represents the focal length of the second lens group; and f represents the focal length of the entire imaging lens system.

Conditional formula (2) defines a preferred conditional range for properly setting the focal length of the second lens group, which is the focusing lens group. Under the upper limit of conditional formula (2), it is possible to allow the second lens group to have a proper refractive power, and thus to reduce the movement amount of the second lens group; it is thus possible to shorten the total length of the imaging lens system. On the other hand, over the lower limit of conditional formula (2), it is possible to prevent the second lens group from having too strong a refractive power, and thus to reduce variations in curvature of field and in spherical aberration during focusing.

It is further preferable that conditional formula (2a) below be fulfilled.

$$0.5 < fg2/f < 1.5 \quad (2a)$$

This conditional formula (2a) defines, within the conditional range defined by conditional formula (2) above, a further preferred conditional range from the above-mentioned and other standpoints. Accordingly, preferably, fulfilling conditional formula (2a) helps obtain more of the benefits mentioned above.

It is preferable that an aperture stop be located within the first lens group. Providing an aperture stop within the first lens group makes it easy to achieve telecentricity in the image-side rays.

It is preferable that conditional formula (3) below be fulfilled.

$$1.0 < fg1/f < 3.0 \quad (3)$$

where fg1 represents the focal length of the first lens group; and f represents the focal length of the entire imaging lens system.

Conditional formula (3) defines a conditional range preferable for properly setting the focal length of the first lens group. Under the upper limit of conditional formula (3), it is possible to allow the first lens group to have a proper focal length; this makes it possible to locate the principal point of the entire system farther to the object side, and thus to shorten the total length of the imaging lens system. On the other hand, over the lower limit of the conditional formula (3), it is possible to prevent the first lens group from having an unnecessarily short focal length, and thus to reduce the high-order spherical aberration and coma occurring in the first lens group; by giving the first lens group a moderate refractive power, it is possible to reduce variation of the image plane ascribable to a manufacturing error.

It is further preferable that conditional formula (3a) below be fulfilled.

$$1.3 < fg1/f < 2.0 \quad (3a)$$

This conditional formula (3a) defines, within the conditional range defined by conditional formula (3) above, a further preferred conditional range from the above-mentioned and other standpoints. Accordingly, preferably, fulfilling conditional formula (3a) helps obtain more of the benefits mentioned above.

It is preferable that the first lens group include at least one positive lens element and at least one negative lens element. By using in the first lens group at least one positive lens element and at least one negative lens element, it is possible to effectively correct spherical aberration and axial chromatic aberration.

It is preferable that the first lens group be composed of, in order from the object side, a first lens element having a positive refractive power and convex to the object side and a second lens element having a negative refractive power and concave to the image side, that the second lens group be composed of, in order from the object side, a third lens element convex to the object side and a fourth lens element having a positive refractive power and convex to the image side, and that the third lens group be composed of a fifth lens element having a negative refractive power and concave to the image side. This five-element lens construction allows a so-called telephoto-type power arrangement ("power" denotes the quantity defined as the reciprocal of the focal length), and helps build a construction advantageous to the reduction of the total length of the imaging lens system.

It is preferable that conditional formula (4) below be fulfilled.

$$0.1 < f1/f < 1.26 \quad (4)$$

where f1 represents the focal length of the lens element disposed at the most object-side position; and f represents the focal length of the entire imaging lens system.

Conditional formula (4) defines a conditional range preferable for properly setting the focal length of the lens element disposed at the most object-side position. Under the upper limit of conditional formula (4), it is possible to allow the most object-side lens element to have a proper focal length, and thus to reduce the total length of the imaging lens system. On the other hand, over the lower limit of conditional formula (4), it is possible to prevent the most object-side lens element from having an unnecessarily short focal length, and thus to reduce the high-order spherical aberration and coma occurring in the first lens group.

It is further preferable that conditional formula (4a) below be fulfilled.

$$0.4 < f1/f < 1.1 \tag{4a}$$

This conditional formula (4a) defines, within the conditional range defined by conditional formula (4) above, a further preferred conditional range from the above-mentioned and other standpoints. Accordingly, preferably, fulfilling conditional formula (4a) helps obtain more of the benefits mentioned above.

It is preferable that the first lens group have a positive refractive power, that the second lens group have a positive refractive power, and that the third lens group have a negative refractive power. This lens construction is a so-called telephoto-type one composed of a positive-powered lens group, namely the first and second lens groups, and a negative-powered lens group, namely the third lens group, and is advantageous to the reduction of the total length of the imaging lens system.

It is preferable that all lens elements be made of a plastic material. That is, it is preferable that the imaging lens system include as lens elements plastic lens elements alone. In recent years, for miniaturization of imaging optical devices themselves which incorporate solid-state image sensors, solid-state image sensors with the same number of pixels have been developed with increasingly small pixel pitches and hence increasingly small imaging area sizes. An imaging lens system for such solid-state image sensors with small imaging area sizes needs to have a comparatively short focal length over the entire system, and thus the individual lens elements have considerably small radii of curvature and diameters. Thus, compared with using glass lenses, which are fabricated by polishing, which is a troublesome process, using as all the lens elements plastic lenses, which are fabricated by injection molding, makes it possible to inexpensively mass-produce even lens elements with small radii of curvature and diameters. Moreover, plastic lenses can be pressed at lower temperatures, and thus help reduce the wear of the molding dies; consequently it is possible to reduce the frequency of replacement and maintenance of the molding dies, and thus to reduce cost.

An imaging lens system according to the invention is suitably used as an imaging lens system for use in a digital appliance (for example, a portable terminal) furnished with an image input capability, and can be combined with an image sensor or the like to build an imaging optical device which optically acquires an image of a subject and outputs it in the form of an electrical signal. An imaging optical device is an optical device that constitutes a main component of a camera used to shoot still and moving images of a subject, and is for example composed of, in order from the object side (that is, from the subject side), an imaging lens system which forms an optical image of an object and an image sensor which converts the optical image formed by the imaging lens system into an electrical signal. By arranging an imaging lens system having the distinctive construction described above in such a way that an optical image of the subject is formed on the sensing surface (that is, imaging area) of the image sensor, it is possible to realize an imaging optical device that has high performance despite being compact and inexpensive, and a digital appliance (for example, a portable terminal) incorporating such an imaging optical device.

Examples of cameras include: digital cameras, video cameras, surveillance cameras, vehicle-mounted cameras, videophone cameras, etc.; and cameras incorporated in, or externally attached to, personal computers, digital appliances (for example, compact, portable information device terminals such as cellular phones, mobile computers, etc.), peripheral devices for those (such as scanners, printers, etc.), other digital appliances, etc. As these examples show, not only can an imaging optical device be used to build cameras, but an imaging optical device can also be incorporated in a variety of appliances to additionally furnish them with camera capabilities. For example, it is possible to build a digital appliance furnished with an image input capability, such as a camera-equipped cellular phone.

Figure 25:
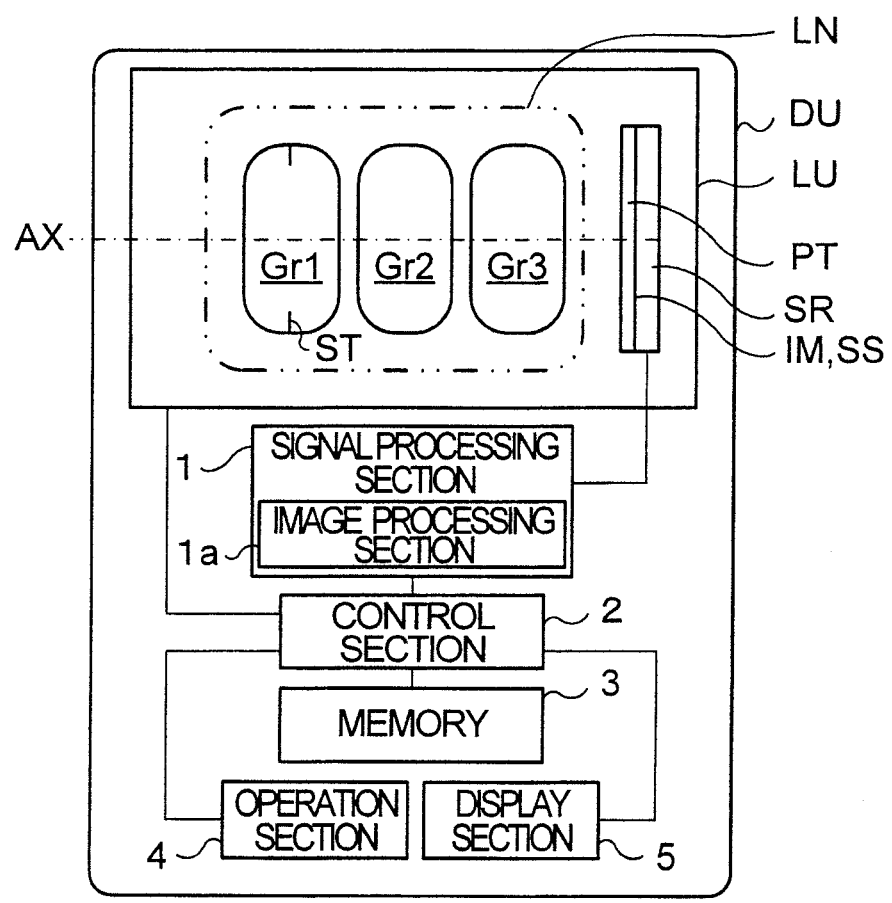
FIG. 25 is a schematic diagram showing an example of an outline of the configuration of a digital appliance incorporating an imaging optical device.

FIG. 25 is a schematic cross sectional view of an example of an outline of the configuration of an digital appliance DU as one example of a digital appliance furnished with an image input capability. The digital appliance DU shown in FIG. 25 incorporates an imaging optical device LU, which is provided with, in order from the object side (that is, from the subject side), an imaging lens system LN which forms an optical image (image plane) IM of an object (AX representing the optical axis), a parallel-plane plate PT (corresponding to an optical filter such as an optical low-pass filter and an infrared (IR) cut filter provided as necessary, the cover glass of an image sensor SR, etc.), and an image sensor SR which converts the optical image IM formed on a sensing surface (imaging area) SS by the imaging lens system LN into an electrical signal. When a digital appliance DU furnished with an image input capability is built with this imaging optical device LU, the latter is typically arranged inside the body of the former. Camera capabilities, on the other hand, can be realized in a variety of configurations that suit the needs at hand. For example, an imaging optical device LU built as a unit may be configured so as to be removable from, or rotatable relative to, the body of a digital appliance DU.

Used as the image sensor SR is, for example, a solid-state image sensor, such as a CCD image sensor or a CMOS image sensor, that has a plurality of pixels. The imaging lens system LN is disposed so as to form an optical image IM of a subject on the sensing surface SS, which is the photoelectric conversion portion of the image sensor SR. Thus, the optical image IM formed by the imaging lens system LN is converted into an electrical signal by the image sensor SR.

The digital appliance DU is provided with, in addition to the imaging optical device LU, a signal processing section 1, a control section 2, a memory 3, an operation section 4, a display section 5, etc. The signal generated by the image sensor SR is subjected to predetermined digital image processing, image compression, etc. in the signal processing section 1, and the resulting digital video signal is recorded on the memory 3 (a semiconductor memory, an optical disc, or the like) and, as the case may be, transmitted to an external device (for example, the communication capability of a cellular phone) via a cable or after being converted into an infrared signal. The control section 2 includes a microcomputer and performs, in a concentrated fashion, control of functions for shooting (functions for shooting still images, functions for shooting moving images, etc.), control of functions for image playback etc., control of a lens moving mechanism for focusing, etc. For example, the control section 2 controls the imaging optical device LU to shoot either a still image or a moving image of the subject. The display section 5 includes a display device such as a liquid crystal monitor, and displays images by use of the image signal resulting from the conversion by the image sensor SR or the image information recorded on the memory 3. The operation section 4 includes operated members such as, operation buttons (for example, a shutter-release button) and an operation dial (for example, a shooting mode dial), and conveys the information entered by the user's operation to the control section 2.

The signal processing section 1 includes an image processing section 1a that electrically processes the image data obtained from the imaging optical device LU. The inclusion of the image processing section 1a makes it possible to alleviate the aberrations that cannot be satisfactorily corrected optically and to alleviate loss in peripheral light.

It is preferable to correct image distortion in the image processing section 1a. Correcting image distortion helps reduce the burden of aberration correction on, in particular, lens elements close to the image plane. This makes it easy to control the position of the exit pupil, and to give lens elements shapes that are easy to produce.

It is preferable to increase the depth of focus in the image processing section 1a. Increasing the depth of focus helps tolerate component variations, and thus helps increase productivity. Moreover, in a case where a driving device is used, it is possible to absorb positional and eccentric errors of the driving device.

As mentioned previously, the imaging lens system LN is a single-focal-length lens system that is composed of, in order from the object side, a first lens group Gr1, a second lens group Gr2, and a third lens group Gr3 and that performs focusing by, while keeping the first and third lens groups Gr1 and Gr3 stationary relative to the image plane IM (that is, the sensing surface SS), moving the second lens group Gr2 in the optical axis AX direction. An optical image IM is formed on the sensing surface SS of the image sensor SR. The focusing of the imaging lens system LN is achieved by moving the second lens group Gr2 in the optical axis AX direction by use of an actuator. With this construction, it is possible to obtain the above-mentioned effects of suppressing variation in curvature of field, achieving compactness, preventing entry of dust, etc.

The optical image IM to be formed by the imaging lens system LN, for example, passes through an optical low-pass filter (corresponding to the parallel-plane plate PT in FIG. 25) having predetermined cut-off frequency characteristics determined by the pixel pitch of the image sensor SR and has thereby the spatial frequency characteristics adjusted to minimize the so-called aliasing noise occurring during conversion into an electrical signal. This helps reduce color moiré. However, when the performance around the resolution limit frequency is held modest, even without the use of an optical low-pass filter, there is no need to care about noise; in a case where the user shoots and views images by use of a display system on which noise is not very conspicuous (for example, the liquid crystal display screen of a cellular phone), there is no need to use an optical low-pass filter.

Next, by way of a first to an eight embodiment, specific optical constructions of the imaging lens system LN will be described in more detail. FIGS. 1 to 8 show, in an optical section, the imaging lens system LN (single-focal-length lens system) in the infinity-focused condition in the first to eighth embodiments respectively. The movement of the focusing group for focusing from infinity to the closest distance is indicated by an arrow mF in FIGS. 1 to 8.

In the first embodiment (FIG. 1), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT disposed to the image side of the imaging lens system LN is assumed to be an optical low-pass filter, an IR cut filter, the seal glass of a solid-state image sensor, etc. It is assumed that all the lens surfaces constituting the imaging lens system LN are aspherical surfaces, and that all the lens elements are made of a plastic material as an optical material. It is also assumed that the adjustment of the focal point as in automatic focusing and macro switching is achieved by inner focusing involving the moving of the third and fourth lens elements L3 and L4 (the second lens group Gr2).

In the second embodiment (FIG. 2), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT disposed to the image side of the imaging lens system LN is assumed to be an optical low-pass filter, an IR cut filter, the seal glass of a solid-state image sensor, etc. It is assumed that all the lens surfaces constituting the imaging lens system LN are aspherical surfaces, and that all the lens elements are made of a plastic material as an optical material. It is also assumed that the adjustment of the focal point as in automatic focusing and macro switching is achieved by inner focusing involving the moving of the third and fourth lens elements L3 and L4 (the second lens group Gr2).

In the third embodiment (FIG. 3), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT disposed to the image side of the imaging lens system LN is assumed to be an optical low-pass filter, an IR cut filter, the seal glass of a solid-state image sensor, etc. It is assumed that all the lens surfaces constituting the imaging lens system LN are aspherical surfaces, and that all the lens elements are made of a plastic material as an optical material. It is also assumed that the adjustment of the focal point as in automatic focusing and macro switching is achieved by inner focusing involving the moving of the third and fourth lens elements L3 and L4 (the second lens group Gr2).

In the fourth embodiment (FIG. 4), the imaging lens system LN is composed of, in order from the object side, a positive first lens element L1, an aperture stop ST, a negative second lens element L2, a negative third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT disposed to the image side of the imaging lens system LN is assumed to be an optical low-pass filter, an IR cut filter, the seal glass of a solid-state image sensor, etc. It is assumed that all the lens surfaces constituting the imaging lens system LN are aspherical surfaces, and that all the lens elements are made of a plastic material as an optical material. It is also assumed that the adjustment of the focal point as in automatic focusing and macro switching is achieved by inner focusing involving the moving of the third and fourth lens elements L3 and L4 (the second lens group Gr2).

In the fifth embodiment (FIG. 5), the imaging lens system LN is composed of, in order from the object side, a positive first lens element L1, an aperture stop ST, a negative second lens element L2, a negative third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT disposed to the image side of the imaging lens system LN is assumed to be an optical low-pass filter, an IR cut filter, the seal glass of a solid-state image sensor, etc. It is assumed that all the lens surfaces constituting the imaging lens system LN are aspherical surfaces, and that all the lens elements are made of a plastic material as an optical material. It is also assumed that the adjustment of the focal point as in automatic focusing and macro switching is achieved by inner focusing involving the moving of the third and fourth lens elements L3 and L4 (the second lens group Gr2).

In the sixth embodiment (FIG. 6), the imaging lens system LN is composed of in order from the object side, an aperture stop ST, a positive first lens element L1, a negative second lens element L2, a positive third lens element L3, and a negative fourth lens element L4. A positive first lens group Gr1 is constituted by the first and second lens elements L1 and L2, a positive second lens group Gr2 is constituted by the third lens element L3, and a negative third lens group Gr3 is constituted by the fourth lens element L4. A parallel-plane plate PT disposed to the image side of the imaging lens system LN is assumed to be an optical low-pass filter, an IR cut filter, the seal glass of a solid-state image sensor, etc. It is assumed that all the lens surfaces constituting the imaging lens system LN are aspherical surfaces, and that all the lens elements are made of a plastic material as an optical material. It is also assumed that the adjustment of the focal point as in automatic focusing and macro switching is achieved by inner focusing involving the moving of the third lens element L3 (the second lens group Gr2).

In the seventh embodiment (FIG. 7), the imaging lens system LN is composed of, in order from the object side, an aperture stop ST, a positive first lens element L1, a negative second lens element L2, a positive third lens element L3, and a negative fourth lens element L4. A positive first lens group Gr1 is constituted by the first and second lens elements L1 and L2, a positive second lens group Gr2 is constituted by the third lens element L3, and a negative third lens group Gr3 is constituted by the fourth lens element L4. A parallel-plane plate PT disposed to the image side of the imaging lens system LN is assumed to be an optical low-pass filter, an IR cut filter, the seal glass of a solid-state image sensor, etc. It is assumed that all the lens surfaces constituting the imaging lens system LN are aspherical surfaces, and that all the lens elements are made of a plastic material as an optical material. It is also assumed that the adjustment of the focal point as in automatic focusing and macro switching is achieved by inner focusing involving the moving of the third lens element L3 (the second lens group Gr2).

In the eighth embodiment (FIG. 8), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT disposed to the image side of the imaging lens system LN is assumed to be an optical low-pass filter, an IR cut filter, the seal glass of a solid-state image sensor, etc. It is assumed that all the lens surfaces constituting the imaging lens system LN are aspherical surfaces, and that all the lens elements are made of a plastic material as an optical material. It is also assumed that the adjustment of the focal point as in automatic focusing and macro switching is achieved by inner focusing involving the moving of the third and fourth lens elements L3 and L4 (the second lens group Gr2).

Plastic materials have large variation in refractive index with variation in temperature. Thus, using plastic lens elements for all lens elements leads to a problem of the imaging point of the entire imaging lens system being displaced with variation in the ambient temperature. In recent years, however, it has been found that mixing inorganic fine particles in a plastic material helps reduce the effect of variation in temperature on the plastic material. Put in more detail, while, in general, mixing fine particles in a transparent plastic material causes scattering of light and leads to lower transmittance, and thus makes the plastic material unfit as an optical material, by reducing the size of the fine particles smaller than the wavelength of the transmitted light, scattering can virtually be prevented.

Moreover, whereas the refractive index of a plastic material lowers as temperature rises, that of organic particles increases as temperature rises. Accordingly, by exploiting their temperature dependence in such a way that they act to cancel each other, it is possible to almost eliminate variation in refractive index. Specifically, by dispersing inorganic particles with a maximum length of 20 nanometers or less in a plastic material as a base material, it is possible to obtain a plastic material of which the refractive index depends little on temperature. For example, by dispersing fine particles of niobium oxide ($Nb_2O_5$) in acrylic resin, it is possible to reduce variation in refractive index with variation in temperature.

In an imaging lens system LN according to the invention, using a plastic material having inorganic particles dispersed as described above in the positive lens elements which have comparatively high refractive powers (for example, the first lens element L1) or in all the lens elements makes it possible to reduce displacement of the imaging point with variation in temperature through the entire imaging lens system LN.

In the embodiments described above and the examples which will be presented later, the principal ray incidence angle of the rays incident on the imaging area of the solid-state image sensor is not necessarily small enough in the periphery of the image field. With recent technology, however, improvements in the arrays of color filters and on-chip microlenses of solid-state image sensors have made it possible to alleviate shading. Specifically, setting the array pitches of color filters and on-chip microlenses slightly smaller than the pixel pitch on the imaging area of the image sensor allows the color filters and on-chip microlenses to be shifted toward the optical axis more the closer to the periphery of the imaging area, and this makes it possible to efficiently direct obliquely incident rays to the sensing portions of the pixels. It is thus possible to reduce the shading occurring in the solid-state image sensor. The examples presented later deal with designs where the requirements mentioned above are somewhat moderated to aim at further compactness in exchange.

EXAMPLES

The constructions and other features of imaging lens systems according to the invention will now be described with reference to the construction data etc. of examples. Examples 1 to 8 (EX 1 to EX 8) presented below are numerical examples corresponding to the above-described first to eighth embodiments, respectively, and the optical construction diagrams (FIGS. 1 to 8) showing the first to eighth embodiments also show the lens constructions of the corresponding ones of Examples 1 to 8 respectively.

In the construction data of each example, listed as surface data are, from the leftmost column rightward, surface number; radius of curvature r (mm); axial surface-to-surface distance d (mm) or, for a distance that varies during focusing, axial surface-to-surface distance dm (mm) when focusing on the closest object distance (an objet distance of 10 cm); refractive index nd for the d-line (with a wavelength of 587.56 nm); Abbe number vd for the d-line; and effective radius (mm). A surface number marked with an asterisk "*" indicates an aspherical surface, and its surface shape is defined by formula (AS) below in terms of a local rectangular coordinate system (X,Y, Z) with its origin at the vertex. Listed as aspherical surface data are aspherical surface coefficients etc. In the aspherical surface data of each example, the coefficient of any term that does not appear equals zero, and for all data, "E-n" stands for "×10$^{-n}$."

[Formula 1]

$$X = \frac{h^2/R}{1+\sqrt{1-(1+K)h^2/R^2}} + \sum A_i h^i \quad (AS)$$

Here, h represents the height in the direction perpendicular to the X axis (the optical axis AX) ($h^2=Y^2+Z^2$);

X represents the amount of sag in the optical axis AX direction at the height h (relative to the vertex);

R represents the reference radius of curvature (corresponding to the radius of curvature r);

K represents the conic constant; and $A_i$ represents the aspherical surface coefficients of order i.

Listed as miscellaneous data are focal length (f, mm) of the entire system; f-number (Fno.); half angle of view (ω, °); diagonal length (2Y', mm, where Y' is the maximum image height) of the sensing surface SS of the image sensor SR; back focal length (fB, mm); entrance pupil position (ENTP, the distance from the first surface to the entrance pupil position, mm); exit pupil position (EXTP the distance from the sensing surface SS to the exit pupil position, mm); front principal point position (H1, the distance from the first surface to the front principal point position, mm); and rear principal point position (H2, the distance from the last surface to the rear principal point position, mm). For the focal length and f-number of the entire system, values are given as observed in each of two focus conditions, namely when focusing on the infinite object distance (an object distance of ∞, infinity) and when focusing on the closest object distance (an object distance of 10 cm). The back focal length fB denotes the distance from the image-side surface of the parallel-plane plate PT to the image plane IM. Listed as lens element data and lens group data are the focal lengths of individual lens elements and lens groups. The values of the conditional formulae and related vales as observed in each example are shown in Table 1.

FIGS. 9 to 16 comprise aberration diagrams of Examples 1 to 8 (EX 1 to EX 8) when focusing on the infinite object distance (an object distance of ∞, infinity), and FIGS. 17 to 24 comprise aberration diagrams of Examples 1 to 8 (EX 1 to EX 8) when focusing on the closest object distance (an object distance of 10 cm). In each of FIGS. 9 to 24, at (A) is an aspherical aberration diagram, at (B) is an astigmatism diagram, and at (C) is a distortion diagram. In the spherical aberration diagrams, a solid line indicates the spherical aberration for the d-line (with a wavelength of 587.56 nm), and a broken line indicates the spherical aberration for the g-line (with a wavelength of 435.84 nm), each given as the deviation (unit: mm) in the optical axis AX direction from the paraxial image plane, the vertical axis representing the height of incidence at the pupil as normalized with its maximum value (that is, the relative pupil height). In the astigmatism diagrams, a broken or dash-dot-dot line T indicates the tangential image plane for the d-line, and a solid line S indicates the sagittal image plane for the d-line, each given as the deviation (unit: mm) in the optical axis AX direction from the paraxial image plane, the vertical axis representing the image height (IMG HT, unit: mm). In the distortion diagrams, the horizontal axis represents the distortion (unit: %) for the d-line, and the vertical axis represents the image height (IMG HT, unit: mm). The maximum value of the image height IMG HT corresponds to the maximum image height Y' on the image plane IM (one-half of the diagonal length of the sensing surface SS of the image sensor SR).

In Example 1 (FIG. 1), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a positive meniscus lens element convex to the object side, the fourth lens element L4 is a positive meniscus lens element convex to the image side, and the fifth lens element L5 is a negative meniscus lens element concave to the image side.

In Example 2 (FIG. 2), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a positive meniscus lens element convex to the object side, the fourth lens element L4 is a positive meniscus lens element convex to the image side, and the fifth lens element L5 is a negative meniscus lens element concave to the image side.

In Example 3 (FIG. 3), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a positive meniscus lens element convex to the object side, the fourth lens element L4 is a positive meniscus lens element convex to the image side, and the fifth lens element L5 is a negative meniscus lens element concave to the image side.

In Example 4 (FIG. 4), the imaging lens system LN is composed of, in order from the object side, a positive first lens element L1, an aperture stop ST, a negative second lens element L2, a negative third lens element L3, a positive fourth lens element L4, and a negative fifth lens element L5. All the lens surfaces are aspherical surfaces. In terms of paraxial surface shapes, the first lens element L1 is a positive meniscus lens element convex to the object side, the second lens element L2 is a negative meniscus lens element concave to the image side, the third lens element L3 is a negative meniscus lens element concave to the image side, the fourth lens element L4 is a positive meniscus lens element convex to the image side, and the fifth lens element L5 is a negative meniscus lens element concave to the image side.

In Example 5 (FIG. 5), the imaging lens system LN is composed of, in order from the object side, a positive first lens element L1, an aperture stop ST, a negative second lens element L2, a negative third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a negative meniscus lens element concave to the image side, the fourth lens element L4 is a biconvex positive lens element, and the fifth lens element L5 is a negative meniscus lens element concave to the image side.

In Example 6 (FIG. 6), the imaging lens system LN is composed of in order from the object side, an aperture stop ST, a positive first lens element L1, a negative second lens element L2, a positive third lens element L3, and a negative fourth lens element L4. All the lens surfaces are aspherical surfaces. In terms of paraxial surface shapes, the first lens element L1 is a biconvex positive lens element, the second lens element L2 is a negative meniscus lens element concave to the image side, the third lens element L3 is a biconvex positive lens element, and the fourth lens element L4 is a negative meniscus lens element concave to the image side.

In Example 7 (FIG. 7), the imaging lens system LN is composed of, in order from the object side, an aperture stop ST, a positive first lens element L1, a negative second lens element L2, a positive third lens element L3, and a negative fourth lens element L4. All the lens surfaces are aspherical surfaces. In terms of paraxial surface shapes, the first lens element L1 is a biconvex positive lens element, the second lens element L2 is a negative meniscus lens element concave to the image side, the third lens element L3 is a positive meniscus lens element convex to the image side, and the fourth lens element L4 is a negative meniscus lens element concave to the image side.

In Example 8 (FIG. 8), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a biconvex positive lens element, the fourth lens element L4 is a positive meniscus lens element convex to the image side, and the fifth lens element L5 is a negative meniscus lens element concave to the image side.

Example 1

Unit: mm

Surface Data

| Surface No. | r | d | dm | nd | vd | Effective Radius |
|---|---|---|---|---|---|---|
| 1* | 1.919 | 0.709 | | 1.54470 | 56.2 | 1.11 |
| 2* | −13.675 | 0.030 | | | | 0.87 |
| 3 (Aperture) | ∞ | 0.020 | | | | 0.80 |
| 4* | 4.123 | 0.300 | | 1.63200 | 23.4 | 0.82 |
| 5* | 1.652 | 0.726 | 0.566 | | | 0.87 |
| 6* | 3.731 | 0.523 | | 1.53050 | 55.7 | 1.43 |
| 7* | 3.720 | 0.247 | | | | 1.64 |
| 8* | −55.999 | 0.768 | | 1.54470 | 56.2 | 1.68 |
| 9* | −2.045 | 0.541 | 0.701 | | | 1.83 |
| 10* | 3.866 | 0.450 | | 1.53050 | 55.7 | 2.16 |
| 11* | 1.208 | 0.490 | | | | 2.58 |
| 12 | ∞ | 0.145 | | 1.51630 | 64.1 | 2.87 |
| 13 | ∞ | 2.90 | | | | |

Aspherical Surface Data

Surface 1

K = 0.41896E−01
A4 = −0.35926E−03
A6 = −0.70430E−02
A8 = 0.70704E−02
A10 = −0.38897E−02

Surface 2

K = −0.84487E+01
A4 = 0.28585E−01
A6 = 0.23500E−01
A8 = −0.49866E−01
A10 = 0.22567E−01

Surface 4

K = −0.29234E+02
A4 = −0.68765E−02
A6 = 0.98390E−01
A8 = −0.15680E+00
A10 = 0.13102E+00
A12 = −0.51129E−01

Surface 5

K = −0.45194E+01
A4 = 0.25276E−01
A6 = 0.64564E−01
A8 = −0.44051E−01
A10 = −0.15027E−02
A12 = 0.13804E−01

Surface 6

K = −0.21242E+02
A4 = −0.11219E−02
A6 = −0.88735E−02
A8 = 0.55257E−02
A10 = −0.23109E−02
A12 = 0.10780E−03

Surface 7

K = −0.22232E+02
A4 = −0.56494E−02
A6 = −0.76307E−02
A8 = 0.19503E−02
A10 = −0.96862E−03
A12 = −0.29481E−04

Surface 8

K = −0.42418E+05
A4 = −0.35840E−01
A6 = 0.64695E−02
A8 = 0.18540E−02
A10 = −0.11067E−02
A12 = 0.12493E−03

Surface 9

K = −0.64254E+01
A4 = −0.91029E−01
A6 = 0.50074E−01
A8 = −0.24836E−01
A10 = 0.12241E−01
A12 = −0.25207E−02
A14 = 0.23437E−04
A16 = 0.32363E−04

-continued

Unit: mm

Surface 10

K = −0.11861E+03
A4 = −0.20365E+00
A6 = 0.83889E−01
A8 = −0.14189E−01
A10 = 0.28182E−03
A12 = 0.17663E−03
A14 = −0.12455E−04

Surface 11

K = −0.72109E+01
A4 = −0.80466E−01
A6 = 0.28408E−01
A8 = −0.72168E−02
A10 = 0.11783E−02
A12 = −0.11781E−03
A14 = 0.53062E−05

Miscellaneous Data

| | |
|---|---|
| f | 4.3 (with an object distance of ∞) |
| Fno. | 2.40 (with an object distance of ∞) |
| f | 4.050 (with an object distance of 10 cm) |
| Fno. | 2.42 (with an object distance of 10 cm) |
| ω | 33.2 |
| 2Y' | 5.712 |
| fB | 0.3 |
| ENTP | 0.57 |
| EXTP | −2.47 |
| H1 | −1.8 |
| H2 | −4 |

Lens Element Data

| Lens Element | Starting Surface | Focal Length |
|---|---|---|
| 1 | 1 | 3.140 |
| 2 | 4 | −4.578 |
| 3 | 6 | 153.475 |
| 4 | 8 | 3.877 |
| 5 | 10 | −3.518 |

Lens Group Data

| Lens Group | Starting Surface | Focal Length |
|---|---|---|
| 1 | 1 | 6.479 |
| 2 | 6 | 3.989 |
| 3 | 10 | −3.518 |

Example 2

Unit: mm

Surface Data

| Surface No. | r | d | dm | nd | vd | Effective Radius |
|---|---|---|---|---|---|---|
| 1* | 1.950 | 0.535 | | 1.54470 | 56.2 | 0.99 |
| 2* | −38.523 | 0.000 | | | | 0.83 |
| 3 (Aperture) | ∞ | 0.100 | | | | 0.80 |
| 4* | 2.499 | 0.230 | | 1.63200 | 23.4 | 0.85 |
| 5* | 1.392 | 0.726 | 0.562 | | | 0.88 |
| 6* | 2.405 | 0.396 | | 1.54470 | 56.2 | 1.47 |
| 7* | 2.468 | 0.408 | | | | 1.65 |
| 8* | −5.418 | 0.645 | | 1.54470 | 56.2 | 1.71 |
| 9* | −1.760 | 0.250 | 0.414 | | | 1.82 |
| 10* | 1.536 | 0.474 | | 1.53050 | 55.7 | 2.45 |
| 11* | 0.919 | 0.735 | | | | 2.60 |
| 12 | ∞ | 0.300 | | 1.51630 | 64.1 | 2.85 |
| 13 | ∞ | 2.91 | | | | |

Aspherical Surface Data

Surface 1

K = −0.30243E+00
A4 = −0.28002E−02
A6 = −0.29517E−01
A8 = 0.34971E−01
A10 = −0.33248E−01

Surface 2

K = −0.14013E+02
A4 = −0.55230E−01
A6 = 0.14702E+00
A8 = −0.19517E+00
A10 = 0.71396E−01

Surface 4

K = −0.20622E+02
A4 = −0.27472E−01
A6 = 0.19885E+00
A8 = −0.23760E+00
A10 = 0.10061E+00
A12 = −0.68691E−02

Surface 5

K = −0.56420E+01
A4 = 0.58302E−01
A6 = 0.84456E−01
A8 = −0.50109E−01
A10 = −0.53197E−01
A12 = 0.49364E−01

Surface 6

K = −0.62762E+01
A4 = −0.31708E−01
A6 = 0.61870E−02
A8 = −0.14411E−03
A10 = −0.53252E−03
A12 = −0.16564E−03

Surface 7

K = −0.48687E+01
A4 = −0.25130E−01
A6 = −0.10666E−01
A8 = 0.10673E−01
A10 = −0.58414E−02
A12 = 0.95948E−03

Surface 8

K = −0.20000E+03
A4 = −0.53315E−01
A6 = 0.38504E−01
A8 = −0.17963E−01
A10 = 0.41318E−02
A12 = −0.26521E−03

Surface 9

K = −0.17424E+01
A4 = −0.37902E−01
A6 = 0.36037E−01
A8 = −0.17731E−01
A10 = 0.10871E−01
A12 = −0.26589E−02
A14 = 0.14780E−04
A16 = 0.45854E−04

Surface 10

K = −0.10849E+02
A4 = −0.15806E+00
A6 = 0.64023E−01
A8 = −0.10627E−01
A10 = 0.36323E−03

-continued

Unit: mm

A12 = 0.89482E−04
A14 = −0.72474E−05
Surface 11

K = −0.43003E+01
A4 = −0.95804E−01
A6 = 0.36222E−01
A8 = −0.10191E−01
A10 = 0.18946E−02
A12 = −0.20474E−03
A14 = 0.94721E−05

Miscellaneous Data

| | |
|---|---|
| f | 4.09 (with an object distance of ∞) |
| Fno. | 2.40 (with an object distance of ∞) |
| f | 3.923 (with an object distance of 10 cm) |
| Fno. | 2.44 (with an object distance of 10 cm) |
| ω | 34.5 |
| 2Y' | 5.712 |
| fB | 0.3 |
| ENTP | 0.38 |
| EXTP | −3.01 |
| H1 | −0.58 |
| H2 | −3.79 |

Lens Element Data

| Lens Element | Starting Surface | Focal Length |
|---|---|---|
| 1 | 1 | 3.424 |
| 2 | 4 | −5.406 |
| 3 | 6 | 53.649 |
| 4 | 8 | 4.505 |
| 5 | 10 | −5.875 |

Lens Group Data

| Lens Group | Starting Surface | Focal Length |
|---|---|---|
| 1 | 1 | 6.707 |
| 2 | 6 | 4.471 |
| 3 | 10 | −5.875 |

Example 3

Unit: mm

Surface Data

| Surface No. | r | d | dm | nd | vd | Effective Radius |
|---|---|---|---|---|---|---|
| 1* | 1.949 | 0.538 | | 1.54470 | 56.2 | 0.99 |
| 2* | −21.407 | −0.004 | | | | 0.82 |
| 3 (Aperture) | ∞ | 0.054 | | | | 0.80 |
| 4* | 2.864 | 0.280 | | 1.63200 | 23.4 | 0.85 |
| 5* | 1.463 | 0.736 | 0.573 | | | 0.89 |
| 6* | 2.489 | 0.345 | | 1.54470 | 56.2 | 1.47 |
| 7* | 2.580 | 0.379 | | | | 1.66 |
| 8* | −5.438 | 0.724 | | 1.54470 | 56.2 | 1.78 |
| 9* | −1.782 | 0.250 | 0.413 | | | 1.85 |
| 10* | 1.738 | 0.535 | | 1.53050 | 55.7 | 2.46 |
| 11* | 0.991 | 0.817 | | | | 2.64 |
| 12 | ∞ | 0.145 | | 1.51630 | 64.1 | 2.89 |
| 13 | ∞ | 2.92 | | | | |

Aspherical Surface Data

Surface 1

K = −0.25694E+00
A4 = −0.21741E−02

A6 = −0.24708E−01
A8 = 0.29221E−01
A10 = −0.27185E−01
Surface 2

K = 0.59165E+01
A4 = −0.41147E−01
A6 = 0.15575E+00
A8 = −0.21832E+00
A10 = 0.88889E−01
Surface 4

K = −0.18964E+02
A4 = −0.30203E−01
A6 = 0.19745E+00
A8 = −0.23573E+00
A10 = 0.95328E−01
A12 = 0.23082E−02
Surface 5

K = −0.43391E+01
A4 = 0.34655E−01
A6 = 0.80831E−01
A8 = −0.33235E−01
A10 = −0.53639E−01
A12 = 0.46311E−01
Surface 6

K = −0.67503E+01
A4 = −0.29400E−01
A6 = 0.37572E−02
A8 = 0.34474E−03
A10 = −0.11997E−02
A12 = −0.62985E−04
Surface 7

K = −0.47028E+01
A4 = −0.25983E−01
A6 = −0.87050E−02
A8 = 0.10541E−01
A10 = −0.61926E−02
A12 = 0.10508E−02
Surface 8

K = −0.20000E+03
A4 = −0.57196E−01
A6 = 0.39909E−01
A8 = −0.14143E−01
A10 = 0.27279E−02
A12 = −0.14220E−03
Surface 9

K = −0.20433E+01
A4 = −0.53943E−01
A6 = 0.37190E−01
A8 = −0.16392E−01
A10 = 0.10740E−01
A12 = −0.26841E−02
A14 = 0.37312E−05
A16 = 0.49116E−04
Surface 10

K = −0.11418E+02
A4 = −0.16320E+00
A6 = 0.65582E−01
A8 = −0.10699E−01
A10 = 0.34782E−03
A12 = 0.91631E−04
A14 = −0.73929E−05
Surface 11

K = −0.43023E+01
A4 = −0.94709E−01
A6 = 0.35974E−01
A8 = −0.10185E−01
A10 = 0.18927E−02

-continued

Unit: mm

A12 = −0.20107E−03
A14 = 0.90241E−05

Miscellaneous Data

| | |
|---|---|
| f | 4.09 (with an object distance of ∞) |
| Fno. | 2.40 (with an object distance of ∞) |
| f | 3.922 (with an object distance of 10 cm) |
| Fno. | 2.42 (with an object distance of 10 cm) |
| ω | 34.5 |
| 2Y' | 5.712 |
| fB | 0.29 |
| ENTP | 0.38 |
| EXTP | −3 |
| H1 | −0.6 |
| H2 | −3.79 |

Lens Element Data

| Lens Element | Starting Surface | Focal Length |
|---|---|---|
| 1 | 1 | 3.306 |
| 2 | 4 | −5.132 |
| 3 | 6 | 55.314 |
| 4 | 8 | 4.549 |
| 5 | 10 | −5.786 |

Lens Group Data

| Lens Group | Starting Surface | Focal Length |
|---|---|---|
| 1 | 1 | 6.582 |
| 2 | 6 | 4.484 |
| 3 | 10 | −5.786 |

Example 4

Unit: mm

Surface Data

| Surface No. | r | d | dm | nd | vd | Effective Radius |
|---|---|---|---|---|---|---|
| 1* | 1.551 | 0.433 | | 1.54470 | 56.2 | 0.88 |
| 2* | 48.237 | 0.048 | | | | 0.74 |
| 3 (Aperture) | ∞ | 0.002 | | | | 0.69 |
| 4* | 2.606 | 0.183 | | 1.63200 | 23.4 | 0.71 |
| 5* | 1.411 | 0.792 | 0.653 | | | 0.74 |
| 6* | 5.418 | 0.325 | | 1.58300 | 30.0 | 1.17 |
| 7* | 2.920 | 0.117 | | | | 1.49 |
| 8* | −232.117 | 0.883 | | 1.54470 | 56.2 | 1.70 |
| 9* | −1.563 | 0.552 | 0.691 | | | 1.74 |
| 10* | 2.244 | 0.430 | | 1.53050 | 55.7 | 2.35 |
| 11* | 0.977 | 0.500 | | | | 2.64 |
| 12 | ∞ | 0.145 | | 1.51630 | 64.1 | 2.80 |
| 13 | ∞ | 2.84 | | | | |

Aspherical Surface Data

Surface 1

K = 0.41415E+00
A4 = −0.37689E−02
A6 = 0.17668E−01
A8 = −0.23233E−01
A10 = 0.33420E−02
A12 = 0.45468E−01

Surface 2

K = 0.50000E+02
A4 = 0.56716E−01
A6 = −0.23292E−01

A8 = 0.21713E−01
A10 = −0.15444E−01
A12 = 0.64215E−01

Surface 4

K = −0.11747E+02
A4 = 0.59161E−02
A6 = 0.38159E−01
A8 = −0.45582E−01
A10 = 0.24607E−02
A12 = 0.17962E−01

Surface 5

K = −0.39137E+01
A4 = 0.50498E−01
A6 = 0.84768E−01
A8 = −0.61733E−01
A10 = −0.44361E−02
A12 = 0.59071E−01

Surface 6

K = 0.80090E+01
A4 = −0.13885E+00
A6 = 0.17173E−01
A8 = −0.12066E−01
A10 = 0.13749E−01
A12 = −0.12510E−01

Surface 7

K = −0.14055E+02
A4 = −0.59943E−01
A6 = −0.25211E−02
A8 = 0.48573E−02
A10 = −0.25635E−02
A12 = −0.53913E−04

Surface 8

K = 0.94435E+04
A4 = −0.26923E−01
A6 = −0.69462E−02
A8 = 0.55880E−02
A10 = 0.20439E−02
A12 = −0.65770E−03

Surface 9

K = −0.21964E+01
A4 = −0.68710E−01
A6 = 0.39030E−01
A8 = −0.34380E−01
A10 = 0.18717E−01
A12 = −0.29798E−02
A14 = 0.23194E−04

Surface 10

K = −0.26589E+02
A4 = −0.18864E+00
A6 = 0.75124E−01
A8 = −0.10881E−01
A10 = −0.20196E−03
A12 = 0.21077E−03
A14 = −0.15301E−04

Surface 11

K = −0.48047E+01
A4 = −0.91556E−01
A6 = 0.36408E−01
A8 = −0.10524E−01
A10 = 0.19471E−02
A12 = −0.19775E−03
A14 = 0.82707E−05

Miscellaneous Data

| | |
|---|---|
| f | 3.68 (with an object distance of ∞) |
| Fno. | 2.45 (with an object distance of ∞) |
| f | 3.500 (with an object distance of 10 cm) |
| Fno. | 2.45 (with an object distance of 10 cm) |

-continued

| Unit: mm | |
|---|---|
| ω | 36.7 |
| 2Y' | 5.53 |
| fB | 0.29 |
| ENTP | 0.37 |
| EXTP | −2.48 |
| H1 | −0.84 |
| H2 | −3.4 |

Lens Element Data

| Lens Element | Starting Surface | Focal Length |
|---|---|---|
| 1 | 1 | 2.933 |
| 2 | 4 | −5.172 |
| 3 | 6 | −11.406 |
| 4 | 8 | 2.884 |
| 5 | 10 | −3.698 |

Lens Group Data

| Lens Group | Starting Surface | Focal Length |
|---|---|---|
| 1 | 1 | 5.346 |
| 2 | 6 | 3.671 |
| 3 | 10 | −3.698 |

Example 5

| Unit: mm | | | | | | |
|---|---|---|---|---|---|---|
| Surface Data | | | | | | |
| Surface No. | r | d | dm | nd | vd | Effective Radius |
| 1* | 2.320 | 0.528 | | 1.54470 | 56.2 | 0.99 |
| 2* | −7.843 | 0.030 | | | | 0.84 |
| 3 (Aperture) | ∞ | 0.041 | | | | 0.71 |
| 4* | 3.252 | 0.300 | | 1.63200 | 23.4 | 0.74 |
| 5* | 1.583 | 0.661 | 0.557 | | | 0.81 |
| 6* | 3.025 | 0.300 | | 1.63200 | 23.4 | 1.25 |
| 7* | 2.080 | 0.120 | | | | 1.53 |
| 8* | 5.788 | 1.391 | | 1.54470 | 56.2 | 1.85 |
| 9* | −1.647 | 0.334 | 0.438 | | | 1.93 |
| 10* | 1.946 | 0.490 | | 1.54470 | 56.2 | 2.22 |
| 11* | 0.869 | 0.700 | | | | 2.64 |
| 12 | ∞ | 0.145 | | 1.51630 | 64.1 | 2.82 |
| 13 | ∞ | 2.86 | | | | |

Aspherical Surface Data

Surface 1

K = −0.22138E+00
A3 = −0.88351E−03
A4 = −0.10849E−01
A5 = 0.14624E−02
A6 = −0.14871E−01
A7 = −0.41092E−03
A8 = 0.48040E−02
A9 = −0.64370E−03
A10 = −0.19742E−01
A11 = 0.12559E−03
A12 = 0.60011E−03
A13 = 0.98700E−03
A14 = 0.11988E−02
A15 = 0.11831E−02
A16 = 0.90388E−03
A17 = 0.33871E−03
A18 = −0.22374E−03
A19 = −0.13311E−02
A20 = −0.27597E−02

Surface 2

K = 0.22795E+02
A3 = 0.45994E−04
A4 = 0.30168E−01
A5 = −0.80161E−04
A6 = 0.17934E−02
A7 = 0.12282E−02
A8 = −0.96301E−01
A9 = 0.16603E−02
A10 = 0.57783E−01
A11 = 0.16529E−02
A12 = 0.92740E−03
A13 = −0.10158E−03
A14 = −0.14652E−02
A15 = −0.32314E−02
A16 = −0.50850E−02
A17 = −0.65290E−02
A18 = −0.56432E−02
A19 = −0.15566E−02
A20 = 0.62102E−02

Surface 4

K = −0.14011E+02
A3 = −0.36399E−02
A4 = 0.10521E−01
A5 = −0.25313E−02
A6 = 0.10730E+00
A7 = −0.16455E−02
A8 = −0.23026E+00
A9 = 0.28841E−02
A10 = 0.15760E+00
A11 = 0.52014E−02
A12 = −0.11583E−01
A13 = 0.25475E−02
A14 = −0.74236E−03
A15 = −0.47662E−02
A16 = −0.88055E−02
A17 = −0.11590E−01
A18 = −0.10920E−01
A19 = −0.34846E−02
A20 = 0.15057E−01

Surface 5

K = −0.44390E+01
A3 = −0.17662E−02
A4 = 0.24441E−01
A5 = −0.10978E−02
A6 = 0.79540E−01
A7 = −0.14890E−02
A8 = −0.82277E−01
A9 = 0.15812E−02
A10 = −0.29836E−01
A11 = 0.34186E−02
A12 = 0.63641E−01
A13 = 0.67654E−03
A14 = −0.24643E−02
A15 = −0.59742E−02
A16 = −0.87544E−02
A17 = −0.89122E−02
A18 = −0.47722E−02
A19 = 0.81122E−02
A20 = 0.32854E−01

Surface 6

K = −0.25309E+02
A3 = −0.27600E−02
A4 = −0.50027E−01
A5 = 0.40529E−03
A6 = −0.15959E−01
A7 = 0.65393E−04
A8 = 0.36509E−02
A9 = −0.27129E−03
A10 = 0.66114E−02
A11 = −0.84400E−04
A12 = −0.52711E−02
A13 = 0.62713E−04

-continued

Unit: mm

A14 = 0.67589E−04
A15 = 0.49187E−04
A16 = 0.23528E−04
A17 = 0.35196E−05
A18 = −0.80046E−05
A19 = −0.88937E−05
A20 = −0.23669E−05
Surface 7

K = −0.12888E+02
A3 = 0.35829E−03
A4 = −0.31911E−01
A5 = −0.25577E−03
A6 = −0.11048E−01
A7 = 0.46714E−04
A8 = 0.52643E−02
A9 = 0.60807E−04
A10 = −0.48379E−03
A11 = −0.85321E−05
A12 = −0.47485E−03
A13 = −0.50193E−05
A14 = 0.10985E−05
A15 = 0.37818E−05
A16 = 0.41821E−05
A17 = 0.29767E−05
A18 = 0.13539E−05
A19 = −0.79265E−07
A20 = −0.10930E−05
Surface 8

K = −0.27859E+02
A3 = −0.72094E−03
A4 = −0.17807E−01
A5 = 0.13927E−03
A6 = 0.78236E−02
A7 = 0.15930E−03
A8 = 0.17687E−02
A9 = 0.28790E−04
A10 = −0.81274E−03
A11 = −0.20335E−05
A12 = 0.55026E−04
A13 = −0.21807E−05
A14 = −0.11154E−05
A15 = −0.39576E−06
A16 = −0.23177E−07
A17 = 0.73803E−07
A18 = 0.80081E−07
A19 = 0.52432E−07
A20 = 0.26497E−07
Surface 9

K = −0.14772E+01
A3 = −0.26748E−02
A4 = −0.38633E−01
A5 = 0.26239E−03
A6 = 0.44326E−01
A7 = 0.20371E−04
A8 = −0.37178E−01
A9 = 0.22525E−04
A10 = 0.17661E−01
A11 = 0.75572E−05
A12 = −0.30949E−02
A13 = 0.98269E−06
A14 = 0.10378E−04
A15 = −0.17678E−06
A16 = 0.31387E−04
A17 = −0.69780E−07
A18 = −0.25511E−07
A19 = 0.14334E−08
A20 = 0.11049E−07
Surface 10

K = −0.17853E+02
A3 = −0.56622E−02
A4 = −0.18458E+00
A5 = 0.99443E−03
A6 = 0.60900E−01

-continued

Unit: mm

A7 = 0.19682E−04
A8 = −0.74261E−02
A9 = −0.18022E−04
A10 = 0.38630E−03
A11 = −0.20844E−05
A12 = −0.10005E−03
A13 = 0.80533E−06
A14 = 0.15281E−04
A15 = 0.19233E−06
A16 = 0.71169E−07
A17 = 0.16057E−07
A18 = −0.91132E−08
A19 = −0.87933E−08
A20 = −0.64079E−08
Surface 11

K = −0.37528E+01
A3 = −0.93591E−02
A4 = −0.91891E−01
A5 = 0.55940E−02
A6 = 0.34040E−01
A7 = −0.49685E−03
A8 = −0.93912E−02
A9 = 0.37605E−04
A10 = 0.15533E−02
A11 = 0.51139E−05
A12 = −0.14004E−03
A13 = 0.37474E−06
A14 = 0.52567E−05
A15 = −0.85652E−07
A16 = −0.31453E−07
A17 = −0.10484E−07
A18 = −0.23880E−08
A19 = 0.12900E−08
A20 = 0.62972E−09

| Miscellaneous Data | |
|---|---|
| f | 3.63 (with an object distance of ∞) |
| Fno. | 2.40 (with an object distance of ∞) |
| f | 3.476 (with an object distance of 10 cm) |
| Fno. | 2.40 (with an object distance of 10 cm) |
| ω | 36.9 |
| 2Y' | 5.53 |
| fB | 0.13 |
| ENTP | 0.41 |
| EXTP | −2.82 |
| H1 | −0.43 |
| H2 | −3.5 |

| Lens Element Data | | |
|---|---|---|
| Lens Element | Starting Surface | Focal Length |
| 1 | 1 | 3.348 |
| 2 | 4 | −5.249 |
| 3 | 6 | −12.023 |
| 4 | 8 | 2.521 |
| 5 | 10 | −3.434 |

| Lens Group Data | | |
|---|---|---|
| Lens Group | Starting Surface | Focal Length |
| 1 | 1 | 6.694 |
| 2 | 6 | 3.058 |
| 3 | 10 | −3.434 |

Example 6

Unit: mm

Surface Data

| Surface No. | r | d | dm | nd | vd | Effective Radius |
|---|---|---|---|---|---|---|
| 1 (Aperture) | ∞ | 0.000 | | | | 0.85 |
| 2* | 2.063 | 0.593 | | 1.54470 | 56.2 | 1.15 |
| 3* | −13.004 | 0.050 | | | | 1.14 |
| 4* | 2.569 | 0.288 | | 1.63200 | 23.4 | 1.16 |
| 5* | 1.324 | 0.964 | 0.814 | | | 1.16 |
| 6* | 79.139 | 0.899 | | 1.54470 | 56.2 | 1.82 |
| 7* | −2.581 | 0.592 | 0.742 | | | 1.86 |
| 8* | 1.758 | 0.510 | | 1.54470 | 56.2 | 2.26 |
| 9* | 1.032 | 0.700 | | | | 2.61 |
| 10 | ∞ | 0.145 | | 1.51630 | 64.1 | 2.83 |
| 11 | ∞ | 2.86 | | | | |

Aspherical Surface Data

Surface 2

K = 0.35079E+00
A4 = 0.54384E−02
A6 = −0.93758E−02
A8 = 0.67299E−02
A10 = 0.33136E−02

Surface 3

K = 0.72675E+01
A4 = 0.45938E−01
A6 = −0.70962E−01
A8 = 0.91426E−01
A10 = −0.24161E−01

Surface 4

K = −0.74930E+01
A4 = −0.44538E−01
A6 = −0.41307E−01
A8 = 0.75935E−01
A10 = −0.86915E−03
A12 = −0.15540E−01

Surface 5

K = −0.29139E+01
A4 = −0.17640E−01
A6 = 0.26285E−01
A8 = −0.25742E−01
A10 = 0.45900E−01
A12 = −0.19641E−01

Surface 6

K = −0.68981E+04
A4 = 0.20614E−01
A6 = −0.15379E−01
A8 = 0.12847E−01
A10 = −0.40650E−02
A12 = 0.46243E−03

Surface 7

K = −0.57775E+01
A4 = −0.66796E−01
A6 = 0.56108E−01
A8 = −0.35663E−01
A10 = 0.16470E−01
A12 = −0.32403E−02
A14 = 0.48988E−04
A16 = 0.38618E−04

Surface 8

K = −0.92343E+01
A4 = −0.13915E+00
A6 = 0.32207E−01
A8 = −0.29637E−02
A10 = 0.55955E−03
A12 = −0.15757E−03
A14 = 0.14149E−04

Surface 9

K = −0.39719E+01
A4 = −0.86033E−01
A6 = 0.28001E−01
A8 = −0.74526E−02
A10 = 0.13072E−02
A12 = −0.12455E−03
A14 = 0.47834E−05

Miscellaneous Data

| | |
|---|---|
| f | 4.09 (with an object distance of ∞) |
| Fno. | 2.40 (with an object distance of ∞) |
| f | 3.942 (with an object distance of 10 cm) |
| Fno. | 2.43 (with an object distance of 10 cm) |
| ω | 34.5 |
| 2Y' | 5.712 |
| fB | 0.36 |
| ENTP | 0 |
| EXTP | −3.02 |
| H1 | −0.86 |
| H2 | −3.72 |

Lens Element Data

| Lens Element | Starting Surface | Focal Length |
|---|---|---|
| 1 | 2 | 3.315 |
| 2 | 4 | −4.747 |
| 3 | 6 | 4.606 |
| 4 | 8 | −6.104 |

Lens Group Data

| Lens Group | Starting Surface | Focal Length |
|---|---|---|
| 1 | 1 | 7.096 |
| 2 | 6 | 4.606 |
| 3 | 8 | −6.104 |

Example 7

Unit: mm

Surface Data

| Surface No. | r | d | dm | nd | vd | Effective Radius |
|---|---|---|---|---|---|---|
| 1 (Aperture) | ∞ | −0.032 | | | | 0.85 |
| 2* | 1.951 | 0.566 | | 1.54470 | 56.2 | 1.05 |
| 3* | −17.056 | 0.050 | | | | 1.05 |
| 4* | 2.894 | 0.254 | | 1.63200 | 23.4 | 1.08 |
| 5* | 1.455 | 1.065 | 0.914 | | | 1.07 |
| 6* | −120.951 | 0.902 | | 1.54470 | 56.2 | 1.48 |
| 7* | −2.489 | 0.510 | 0.660 | | | 1.63 |
| 8* | 1.852 | 0.547 | | 1.54470 | 56.2 | 1.89 |
| 9* | 1.027 | 0.700 | | | | 2.26 |
| 10 | ∞ | 0.145 | | 1.51630 | 64.1 | 2.43 |
| 11 | ∞ | 2.47 | | | | |

Aspherical Surface Data

Surface 2

K = 0.37954E+00
A4 = 0.42487E−03
A6 = −0.58565E−02
A8 = 0.29946E−02
A10 = 0.40040E−02

-continued

Unit: mm

Surface 3

K = 0.50000E+02
A4 = 0.36810E−01
A6 = −0.68088E−01
A8 = 0.99686E−01
A10 = −0.30795E−01
Surface 4

K = −0.98054E+01
A4 = −0.38873E−01
A6 = −0.41122E−01
A8 = 0.79571E−01
A10 = 0.71123E−02
A12 = −0.23859E−01
Surface 5

K = −0.27418E+01
A4 = −0.21715E−01
A6 = 0.27806E−01
A8 = −0.16153E−01
A10 = 0.48907E−01
A12 = −0.25155E−01
Surface 6

K = 0.55129E+04
A4 = 0.88868E−02
A6 = −0.13257E−01
A8 = 0.11592E−01
A10 = −0.41505E−02
A12 = 0.42410E−03
Surface 7

K = −0.54244E+01
A4 = −0.77850E−01
A6 = 0.56741E−01
A8 = −0.35018E−01
A10 = 0.16195E−01
A12 = −0.33737E−02
A14 = 0.38167E−04
A16 = 0.47113E−04
Surface 8

K = −0.10923E+02
A4 = −0.15245E+00
A6 = 0.38133E−01
A8 = −0.29435E−02
A10 = 0.44349E−03
A12 = −0.20516E−03
A14 = 0.22549E−04
Surface 9

K = −0.42062E+01
A4 = −0.80572E−01
A6 = 0.25434E−01
A8 = −0.67765E−02
A10 = 0.12331E−02
A12 = −0.12285E−03
A14 = 0.48562E−05

Miscellaneous Data

| | |
|---|---|
| f | 4.09 (with an object distance of ∞) |
| Fno. | 2.40 (with an object distance of ∞) |
| f | 3.942 (with an object distance of 10 cm) |
| Fno. | 2.43 (with an object distance of 10 cm) |
| ω | 34.5 |
| 2Y' | 5.712 |
| fB | 0.35 |
| ENTP | 0 |
| EXTP | −2.96 |
| H1 | −0.96 |
| H2 | −3.74 |

-continued

Unit: mm

Lens Element Data

| Lens Element | Starting Surface | Focal Length |
|---|---|---|
| 1 | 2 | 3.249 |
| 2 | 4 | −4.968 |
| 3 | 6 | 4.653 |
| 4 | 8 | −5.518 |

Lens Group Data

| Lens Group | Starting Surface | Focal Length |
|---|---|---|
| 1 | 1 | 6.620 |
| 2 | 6 | 4.653 |
| 3 | 8 | −5.518 |

Example 8

Unit: mm

Surface Data

| Surface No. | r | d | dm | nd | vd | Effective Radius |
|---|---|---|---|---|---|---|
| 1* | 2.794 | 0.60 | | 1.54470 | 56.2 | 0.96 |
| 2* | −15.241 | 0.03 | | | | 0.69 |
| 3 (Aperture) | ∞ | 0.06 | | | | 0.63 |
| 4* | 2.060 | 0.30 | | 1.63200 | 23.4 | 0.69 |
| 5* | 1.292 | 0.60 | 0.507 | | | 0.77 |
| 6* | 5.256 | 1.08 | | 1.54470 | 56.2 | 1.31 |
| 7* | −2.528 | 0.22 | | | | 1.53 |
| 8* | −1.234 | 0.45 | | 1.63200 | 23.4 | 1.64 |
| 9* | −1.133 | 0.41 | 0.504 | | | 1.72 |
| 10* | 7.226 | 0.65 | | 1.63200 | 23.4 | 1.89 |
| 11* | 1.418 | 0.50 | | | | 2.51 |
| 12 | ∞ | 0.30 | | 1.51630 | 64.1 | 2.79 |
| 13 | ∞ | 2.87 | | | | |

Aspherical Surface Data

Surface 1

K = 0.69209E+00
A4 = 0.52106E−02
A6 = 0.14389E−01
A8 = −0.47556E−01
A10 = 0.10714E+00
A12 = −0.92454E−01
A14 = 0.32977E−01
Surface 2

K = 0.12110E+02
A4 = −0.29709E−01
A6 = 0.23913E+00
A8 = −0.42925E+00
A10 = 0.64063E+00
A12 = −0.64759E+00
A14 = 0.34145E+00
Surface 4

K = −0.97334E+01
A4 = −0.79196E−01
A6 = 0.18988E+00
A8 = −0.76588E−01
A10 = −0.37412E+00
A12 = 0.75641E+00
A14 = −0.43044E+00
Surface 5

K = −0.37509E+01
A4 = −0.43905E−01

-continued

Unit: mm

A6 = 0.78331E−01
A8 = 0.15738E−02
A10 = −0.15496E+00
A12 = 0.22392E+00
A14 = −0.10266E+00
Surface 6

K = 0.12084E+02
A4 = −0.18387E−01
A6 = −0.21808E−01
A8 = 0.27119E−01
A10 = −0.26987E−01
A12 = 0.95160E−02
A14 = −0.11120E−02
Surface 7

K = −0.50031E+00
A4 = −0.13089E−01
A6 = 0.16455E−01
A8 = −0.19307E−01
A10 = 0.10697E−01
A12 = −0.39845E−02
A14 = 0.66084E−03
Surface 8

K = −0.57182E+00
A4 = 0.48335E−01
A6 = 0.47253E−01
A8 = −0.32998E−02
A10 = −0.31320E−02
A12 = 0.11277E−02
A14 = −0.12406E−03
Surface 9

K = −0.25945E+01
A4 = −0.76929E−01
A6 = 0.54855E−01
A8 = −0.51051E−02
A10 = 0.16342E−02
A12 = −0.10678E−02
A14 = 0.13050E−03
Surface 10

K = −0.30000E+02
A4 = −0.13156E+00
A6 = 0.32407E−01
A8 = −0.22211E−02
A10 = −0.90932E−03
A12 = 0.16975E−03
A14 = −0.63405E−06
Surface 11

K = −0.57247E+01
A4 = −0.70789E−01
A6 = 0.22784E−01
A8 = −0.57758E−02
A10 = 0.92623E−03
A12 = −0.87481E−04
A14 = 0.36677E−05

Miscellaneous Data

| | |
|---|---|
| f | 3.83 (with an object distance of ∞) |
| Fno. | 2.81 (with an object distance of ∞) |
| f | 3.649 (with an object distance of 10 cm) |
| Fno. | 2.81 (with an object distance of 10 cm) |
| ω | 37.6 |
| 2Y' | 5.96 |
| fB | 0.25 |
| ENTP | 0.46 |
| EXTP | −2.69 |
| H1 | −0.7 |
| H2 | −3.57 |

-continued

Unit: mm

Lens Element Data

| Lens Element | Starting Surface | Focal Length |
|---|---|---|
| 1 | 1 | 4.387 |
| 2 | 4 | −6.471 |
| 3 | 6 | 3.294 |
| 4 | 8 | 8.010 |
| 5 | 10 | −2.919 |

Lens Group Data

| Lens Group | Starting Surface | Focal Length |
|---|---|---|
| 1 | 1 | 9.189 |
| 2 | 6 | 2.747 |
| 3 | 10 | −2.919 |

TABLE 1

| Conditional Formula etc. | | Example 1 | Example 2 | Example 3 | Example 4 |
|---|---|---|---|---|---|
| (1) | $|Fi1/Fi2| − |Fm1|$ | 0.11 | 0.52 | 0.50 | 0.08 |
| (2) | $fg2/f$ | 0.93 | 1.09 | 1.10 | 0.99 |
| (3) | $fg1/f$ | 1.51 | 1.64 | 1.61 | 1.45 |
| (4) | $f1/f$ | 0.73 | 0.84 | 0.81 | 0.80 |
| | Fi1 | −7.62 | −10.10 | −10.77 | −5.24 |
| | Fi2 | 3.99 | 2.44 | 2.61 | 2.84 |
| | Fm1 | −7.31 | −9.10 | −9.72 | −5.12 |
| | Fm2 | 4.05 | 2.51 | 2.67 | 2.90 |

| Conditional Formula etc. | | Example 5 | Example 6 | Example 7 | Example 8 |
|---|---|---|---|---|---|
| (1) | $|Fi1/Fi2| − |Fm1|$ | 0.34 | 0.02 | 0.02 | 0.03 |
| (2) | $fg2/f$ | 0.84 | 1.13 | 1.14 | 0.72 |
| (3) | $fg1/f$ | 1.84 | 1.74 | 1.62 | 2.40 |
| (4) | $f1/f$ | 0.92 | 0.81 | 0.80 | 1.15 |
| | Fi1 | −12.08 | −3.31 | −3.50 | −4.35 |
| | Fi2 | 2.66 | 3.20 | 3.22 | 2.61 |
| | Fm1 | −11.35 | −3.30 | −3.50 | −4.29 |
| | Fm2 | 2.71 | 3.27 | 3.28 | 2.63 |

LISTS OF REFERENCE SIGNS

DU digital appliance
LU imaging optical device
LN imaging lens system
GR1-GR3 first to third lens groups
L1-L5 first to fifth lens elements
ST aperture stop (aperture)
SR image sensor
SS sensing surface (imaging area)
IM image plane (optical image)
AX optical axis
1 signal processing section
1a image processing section
2 control section
3 memory
4 operation section
5 display section

The invention claimed is:

1. A single-focal-length imaging lens system comprising, in order from an object side:
a first lens group, the first lens group being composed of, in order from the object side, a first lens element having a positive refractive power and convex to the object side and a second lens element having a negative refractive power and concave to the image side;

a second lens group which includes at least one positive lens element, the second lens group being composed of, in order from the object side, a third lens element convex to the object side and a fourth lens element having a positive refractive power and convex to the image side; and a third lens group which includes at least one aspherically shaped lens element having an inflection point at a position other than an intersection with an optical axis, the third lens group being composed of a fifth lens element having a negative refractive power and concave to the image side, wherein the imaging lens system performs focusing by, while keeping the first and third lens groups stationary relative to an image plane, moving the second lens group in an optical axis direction, an air lens formed by an interval between the first and second lens groups has a negative refractive power, an air lens formed by an interval between the second and third lens groups has a positive refractive power, and conditional formula (1) below is fulfilled;

$$0 \leq |Fi1/Fi2| - |Fm1/Fm2| \leq 10 \tag{1}$$

where, when the air lens formed by the interval between the first and second lens groups is referred to as a first air lens, and the air lens formed by the interval between the second and third lens groups is referred to as a second air lens, then Fi1 represents a focal length of the first air lens when focusing on an infinite object distance;

Fi2 represents a focal length of the second air lens when focusing on the infinite object distance;

Fm1 represents the focal length of the first air lens when focusing on a closest object distance; and Fm2 represents the focal length of the second air lens when focusing on the closest object distance.

2. The imaging lens system according to claim 1, wherein conditional formula (1a) below is fulfilled:

$$0 \leq |Fi1/Fi2| - Fm1/Fm2| \leq 3 \tag{1a}$$

3. The imaging lens system according to claim 1, wherein conditional formula (2) below is fulfilled:

$$0.1 < fg2/f < 2 \tag{2}$$

where fg2 represents a focal length of the second lens group; and f represents a focal length of the entire imaging lens system.

4. The imaging lens system according to claim 1, wherein conditional formula (2a) below is fulfilled:

$$0.5 < fg2/f < 1.5 \tag{2a}$$

where fg2 represents a focal length of the second lens group; and f represents a focal length of the entire imaging lens system.

5. The imaging lens system according to claim 1, wherein an aperture stop is located within the first lens group.

6. The imaging lens system according to claim 1, wherein conditional formula (3) below is fulfilled:

$$1.0 < fg1/f < 3.0 \tag{3}$$

where fg1 represents a focal length of the first lens group; and
f represents a focal length of the entire imaging lens system.

7. The imaging lens system according to claim 1, wherein conditional formula (3a) below is fulfilled:

$$1.3 < fg1/f < 2.0 \tag{3a}$$

where fg1 represents a focal length of the first lens group; and f represents a focal length of the entire imaging lens system.

8. The imaging lens system according to claim 1, wherein the first lens group includes at least one positive lens element and at least one negative lens element.

9. The imaging lens system according to claim 1, wherein conditional formula (4) below is fulfilled:

$$0.1 < f1/f < 1.26 \tag{4}$$

where f1 represents a focal length of a lens element disposed at the most object-side position; and f represents a focal length of the entire imaging lens system.

10. The imaging lens system according to claim 1, wherein conditional formula (4a) below is fulfilled:

$$0.4 < f1/f < 1.1 \tag{4a}$$

where f1 represents a focal length of a lens element disposed at the most object-side position; and f represents a focal length of the entire imaging lens system.

11. The imaging lens system according to claim 1, wherein the first lens group has a positive refractive power, the second lens group has a positive refractive power, and the third lens group has a negative refractive power.

12. The imaging lens system according to claim 1, wherein all the lens elements are formed of a plastic material.

13. An imaging optical device comprising:

an image sensor which converts an optical image formed on an imaging area into an electrical signal; and a single-focal-length imaging lens system which is arranged such that an optical image of a subject is formed on the imaging area of the image sensor, the imaging lens system comprising, in order from an object side:

a first lens group, the first lens group being composed of, in order from the object side, a first lens element having a positive refractive power and convex to the object side and a second lens element having a negative refractive power and concave to the image side;

a second lens group which includes at least one positive lens element, the second lens group being composed of, in order from the object side, a third lens element convex to the object side and a fourth lens element having a positive refractive power and convex to the image side; and a third lens group which includes at least one aspherically shaped lens element having an inflection point at a position other than an intersection with an optical axis, the third lens group being composed of a fifth lens element having a negative refractive power and concave to the image side, wherein the imaging lens system performs focusing by, while keeping the first and third lens groups stationary relative to an image plane, moving the second lens group in an optical axis direction, an air lens formed by an interval between the first and second lens groups has a negative refractive power, an air lens formed by an interval between the second and third lens groups has a positive refractive power, and conditional formula (1) below is fulfilled;

$$0 \leq |Fi1/Fi2| - |Fm1/Fm2| \leq 10 \tag{1}$$

where, when the air lens formed by the interval between the first and second lens groups is referred to as a first air lens, and the air lens formed by the interval between the second and third lens groups is referred to as a second air lens, then Fi1 represents a focal length of the first air lens when focusing on an infinite object distance;

Fi2 represents a focal length of the second air lens when focusing on the infinite object distance;

Fm1 represents the focal length of the first air lens when focusing on a closest object distance; and Fm2 represents the focal length of the second air lens when focusing on the closest object distance.

14. A digital appliance comprising an imaging optical device so as to be additionally furnished with at least one of a function of shooting a still image of the subject and a function of shooting a moving image of the subject, the imaging optical device comprising:

an image sensor which converts an optical image formed on an imaging area into an electrical signal; and a single-focal-length imaging lens system which is arranged such that an optical image of a subject is formed on the imaging area of the image sensor, the imaging lens system comprising, in order from an object side:

a first lens group, the first lens group being composed of, in order from the object side, a first lens element having a positive refractive power and convex to the object side and a second lens element having a negative refractive power and concave to the image side;

a second lens group which includes at least one positive lens element, the second lens group being composed of, in order from the object side, a third lens element convex to the object side and a fourth lens element having a positive refractive power and convex to the image side; and a third lens group which includes at least one aspherically shaped lens element having an inflection point at a position other than intersection with an optical axis, the third lens group being composed of a fifth lens element having a negative refractive power and concave to the image side, wherein the imaging lens system performs focusing by, while keeping the first and third lens groups stationary relative to an image plane, moving the second lens group in an optical axis direction, an air lens formed by an interval between the first and second lens groups has a negative refractive power, an air lens formed by an interval between the second and third lens groups has a positive refractive power, and conditional formula (1) below is fulfilled;

$$0 \leq |Fi1/Fi2| - |Fm1/Fm2| \leq 10 \tag{1}$$

where, when the air lens formed by the interval between the first and second lens groups is referred to as a first air lens, and the air lens formed by the interval between the second and third lens groups is referred to as a second air lens, then Fi1 represents a focal length of the first air lens when focusing on an infinite object distance;

Fi2 represents a focal length of the second air lens when focusing on the infinite object distance;

Fm1 represents the focal length of the first air lens when focusing on a closest object distance; and Fm2 represents the focal length of the second air lens when focusing on the closest object distance.

15. The digital appliance according to claim 14, wherein the digital appliance is a portable terminal.

* * * * *